United States Patent
Reynal et al.

(10) Patent No.: US 11,914,783 B2
(45) Date of Patent: Feb. 27, 2024

(54) HAPTIC-FEEDBACK TOUCH DEVICE WITH SPATIALIZED TEXTURES

(71) Applicant: HAP2U, Saint-Martin-d'Hères (FR)

(72) Inventors: Baptiste Reynal, Saint-Martin-d'Hères (FR); Mickael Cottin-Bizonne, Saint-Martin-d'Hères (FR)

(73) Assignee: HAP2U, Saint-Martin d'Hères (FR)

( * ) Notice: Subject to any disclaimer, the term of this patent is extended or adjusted under 35 U.S.C. 154(b) by 0 days.

(21) Appl. No.: 18/250,722

(22) PCT Filed: Oct. 22, 2021

(86) PCT No.: PCT/EP2021/079404
§ 371 (c)(1),
(2) Date: Apr. 26, 2023

(87) PCT Pub. No.: WO2022/090090
PCT Pub. Date: May 5, 2022

(65) Prior Publication Data
US 2023/0393658 A1     Dec. 7, 2023

(30) Foreign Application Priority Data
Oct. 26, 2020   (FR) .................................. FR2010955

(51) Int. Cl.
*G06F 3/0354*   (2013.01)
*G06F 3/01*      (2006.01)
(Continued)

(52) U.S. Cl.
CPC ............ *G06F 3/016* (2013.01); *G06F 3/0414* (2013.01); *G06F 3/0447* (2019.05); *G06F 3/0488* (2013.01); *G06F 2203/014* (2013.01)

(58) Field of Classification Search
CPC ...... G06F 3/016; G06F 3/0414; G06F 3/0447; G06F 3/0488; G06F 2203/014
See application file for complete search history.

(56) References Cited

U.S. PATENT DOCUMENTS

| 8,405,618 B2 | 3/2013 | Colgate et al. |
| 10,445,994 B2 | 10/2019 | Ramsay et al. |

(Continued)

FOREIGN PATENT DOCUMENTS

| EP | 1956466 B1 | 8/2013 |
| EP | 2461233 B1 | 4/2014 |

(Continued)

OTHER PUBLICATIONS

Biet et al., "Squeeze film effect for the design of an ultrasonic tactile plate," IEEE Transactions on Ultrasonics, Ferroelectrics and Frequency Control, IEEE, 2007, 54 (12), pp. 2678-2688.
(Continued)

*Primary Examiner* — Sanghyuk Park
(74) *Attorney, Agent, or Firm* — TraskBritt

(57) ABSTRACT

A method for implementing a touch device—having a plate, touchable by an external body and having at least one texturing area assigned with a texturing pattern oriented relative to a reference axis, and at least one transducer configured to vibrate the plate at an ultrasonic vibration frequency and controllable by an activation signal—includes moving the external body along the texturing area; determining a position of the external body on the texturing area; measuring a speed of the external body along the plate; and, when the external body moves along the texturing area, generating the activation signal to activate the, or each, transducer. Measuring the speed takes into account the reference axis and measuring a component of the speed of the external body over the reference axis. The activation signal depends on the texturing pattern and on the component of the speed.

23 Claims, 14 Drawing Sheets

(51) Int. Cl.
    *G06F 3/041*     (2006.01)
    *G06F 3/044*     (2006.01)
    *G06F 3/0488*     (2022.01)

(56) References Cited

U.S. PATENT DOCUMENTS

| | | | |
|---|---|---|---|
| 11,029,719 B2 | 6/2021 | Klein et al. | |
| 2011/0285637 A1* | 11/2011 | Karkkainen | G06F 3/016 345/173 |
| 2014/0118127 A1* | 5/2014 | Levesque | G08B 6/00 340/407.2 |
| 2016/0328019 A1* | 11/2016 | Taninaka | G06F 3/04883 |

FOREIGN PATENT DOCUMENTS

| | | | |
|---|---|---|---|
| EP | 2728445 | A2 | 5/2014 |
| EP | 2733575 | A1 | 5/2014 |
| EP | 3566115 | B1 | 12/2021 |
| FR | 3072478 | A1 | 4/2019 |
| FR | 3098323 | B1 | 7/2021 |
| JP | 6739692 | B1 | 7/2020 |
| WO | 2017/072232 | A2 | 5/2017 |

OTHER PUBLICATIONS

International Search Report for International Application No. PCT/EP2021/079404, dated Jan. 25, 2022, 6 pages with English translation.

International Written Opinion for International Application No. PCT/EP2021/079404, dated Jan. 25, 2022, 9 pages with English machine translation.

Vezzoli et al., "Couplage vibration ultrasonique et electro-vibration pour la stimulation tactile" [in English: "Ultrasonic vibration and electro-vibration coupling for tactile stimulation" or "Coupling ultrasonic vibration and electro-vibration for tactile stimulation"], Electrical Engineering Symposium SGE (Jul. 2014) 8 pages with English machine translation.

\* cited by examiner

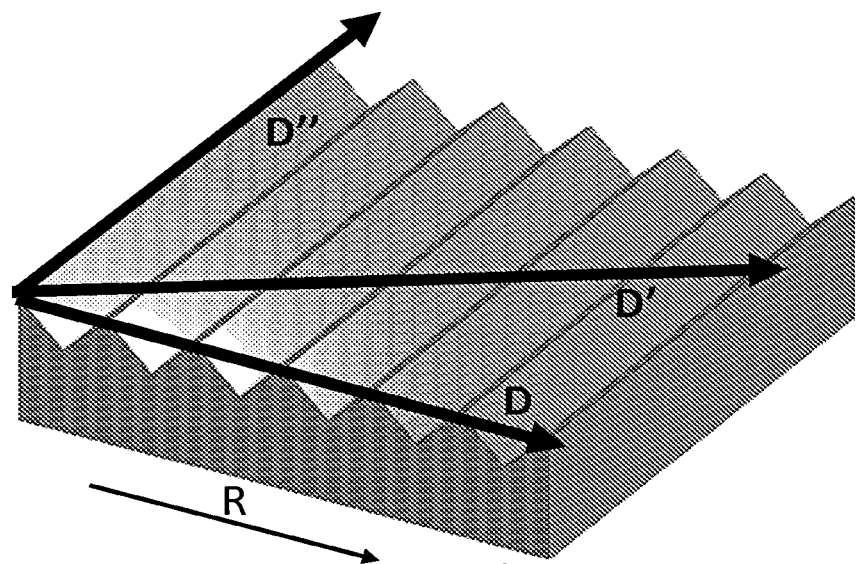
Fig. 3A
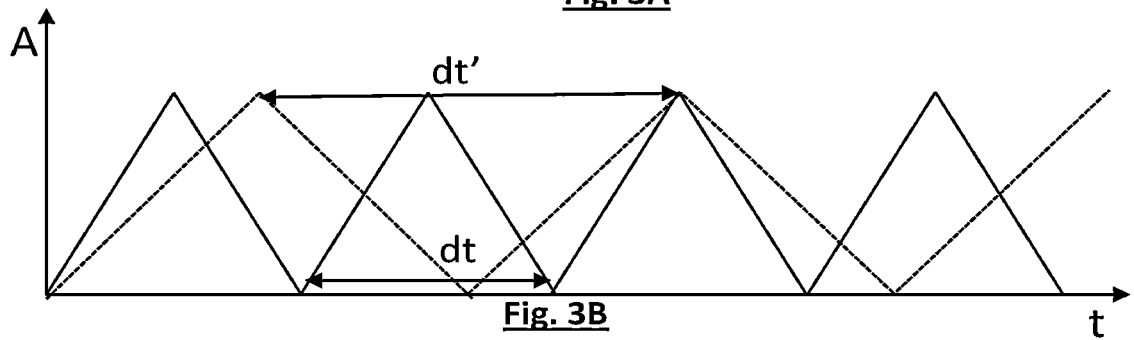
Fig. 3B
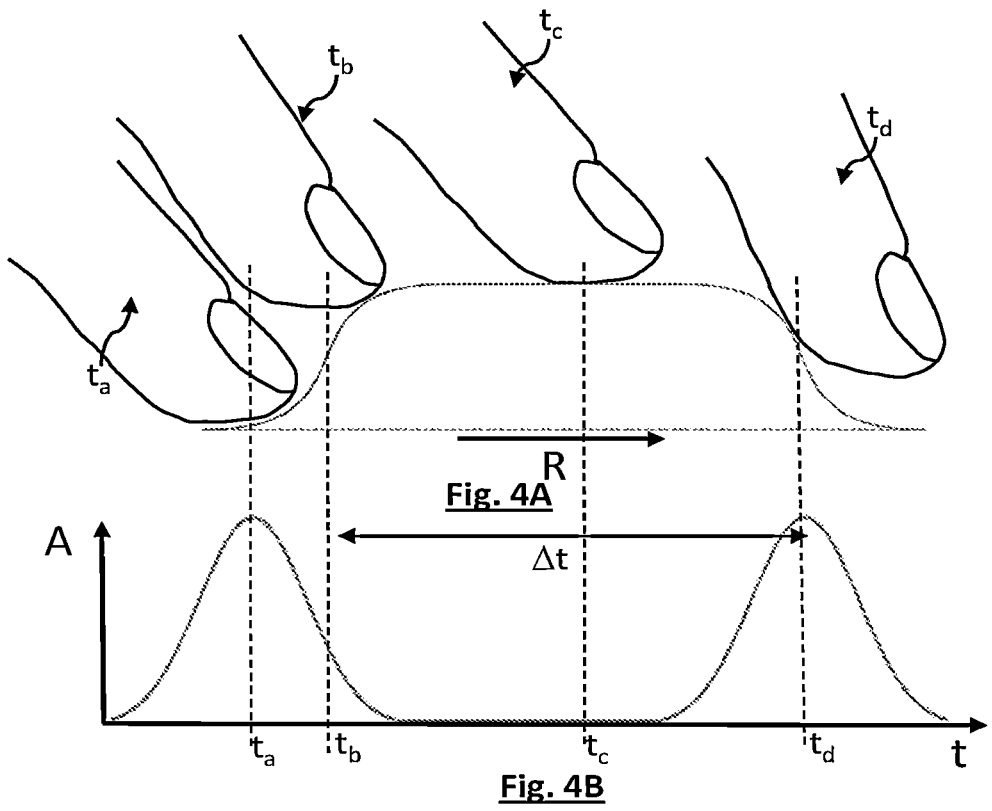
Fig. 4A
Fig. 4B

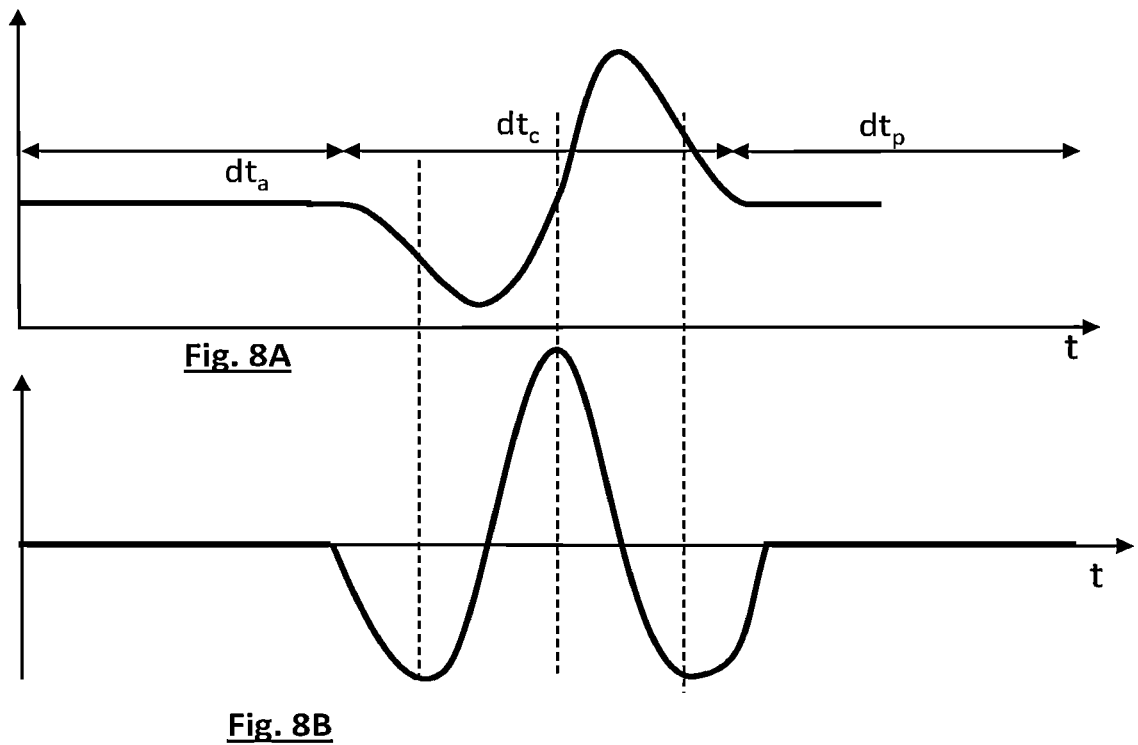
Fig. 8A
Fig. 8B
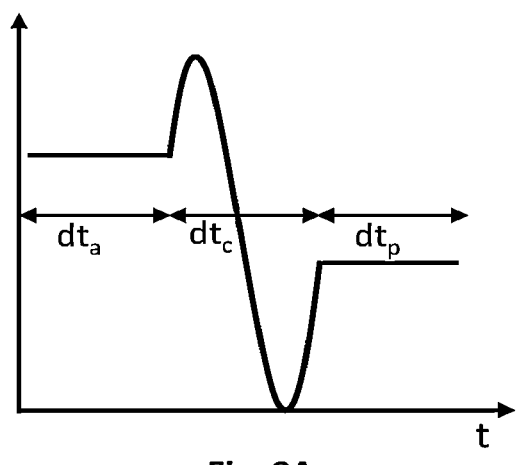
Fig. 9A
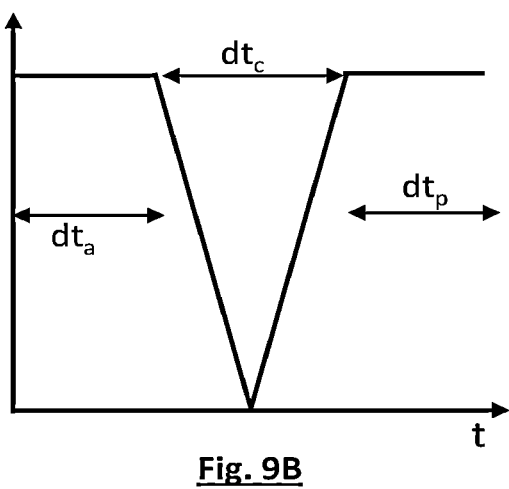
Fig. 9B

HAPTIC-FEEDBACK TOUCH DEVICE WITH SPATIALIZED TEXTURES

CROSS-REFERENCE TO RELATED APPLICATIONS

This application is a national phase entry under 35 U.S.C. § 371 of International Patent Application PCT/EP2021/079404, filed Oct. 22, 2021, designating the United States of America and published as International Patent Publication WO 2022/090090 A1 on May 5, 2022, which claims the benefit under Article 8 of the Patent Cooperation Treaty to French Patent Application Serial No. FR2010955, filed Oct. 26, 2020.

TECHNICAL FIELD

The disclosure relates to a haptic feedback touch device capable of being touched by an external body, for example a finger of a user or a stylus handled by a user.

BACKGROUND

Conventional interfaces intended for devices, whether industrial devices or devices intended for the general public, frequently use control elements of the button type, for example pushbuttons, adjustment wheels or sliders. This type of element can be used to select and/or set operating parameters of the device controlled by the interface.

An alternative to this type of interface has appeared with the development of touch screens, in particular capacitive-effect touch screens. These can work interactively, and very intuitively. They are now used both for common devices, for example mobile phones, or automobile dashboards, but also in more specialized industrial applications. However, a touch screen is a usually flat surface without any texturing.

Devices have been developed that allow a sensation of texture to be experienced when a user's finger is applied to a flat screen. The principles of such texturing are described in the publication Biet M. et al., "Squeeze film effect for the design of an ultrasonic tactile plate," IEEE Transactions on Ultrasonic, Ferroelectrics and Frequency Control, IEEE, 2007, 54 (12), pp. 2678-2688, for example, or in the patent application EP1956466, and also in the publication Vezzoli et al., "Couplage vibration ultrasonique et électro-vibration pour 1a stimulation tactile" [Ultrasonic vibration and electrovibration coupling for tactile stimulation], Electrical Engineering Symposium SGE 2014. The latter compares two tactile stimulation techniques, including that using what is known as the ultrasonic vibration effect. These documents describe a touch interface comprising a smooth plate, forming a contact surface intended to be touched by a finger. This plate is vibrated by multiple piezoelectric transducers arranged in contact with the plate, below the latter. The transducers and the plate form a resonator conducive to the formation of a standing bending wave, of the Lamb wave type. When the vibration resonant frequency of the contact surface is in the ultrasonic range, for example between 10 kHz and 200 kHz, and the amplitude of the vibration is low, typically a few microns, the user may experience an effect of texturing on the contact surface when their finger slides along the surface. This effect is known and is commonly referred to by the term "squeeze film" (or overpressure film). The vibration of the plate generates an air cushion between the finger and the plate, reducing the friction of the finger on the plate. This is also referred to as ultrasonic lubrication. By modulating the vibration, the friction of the finger on the plate is altered. The user can thus get an impression of texturing, taking the form of a sensation of roughness, or a certain resistance to sliding, while the contact surface remains smooth. This effect was applied to transparent or non-transparent contact surfaces, forming a haptic interface. This type of interface can be combined with a touch screen.

Other technologies that can be used for haptic feedback have been developed. These notably include what are known as vibrotactile technologies, whereby an interface generates a vibration when a user performs an operation on the interface. For example, the document U.S. Ser. No. 10/445,994B2 describes a click effect generated using a rotary motor. The latter generates a vibration propagating over the entire interface. The vibration is emitted at a low frequency, typically less than 1000 Hz, and with an amplitude of the order of mm. It is then experienced in the form of a jolt, affecting the entire interface, including the casing, in the same way as a brief vibration emitted by a mobile phone. The patent EP2461233 describes a flat touch interface that can be vibrated at a low frequency and is configured to give rise to a click effect when a finger acts on a button.

The U.S. Pat. No. 8,405,618 describes a haptic interface comprising a multitude of abutting plates, each plate being connected to a piezoelectric transducer. This patent indicates that the use of a multitude of abutting plates is necessary in order to cover a surface such as the surface of a touch pad or a smartphone.

The documents EP2728445 A2, EP2733575 A1 and US2016/0328019 A1 describe haptic interfaces comprising a plate that is intended to be touched by a finger. When the finger slides along the plate, the haptic interface generates haptic feedback to modulate finger friction on the plate. The inventors have designed a haptic device, based on the use of ultrasonic vibration that produces an ultrasonic lubrication effect (known as the "squeeze-film" effect), having new functionalities. These notably include taking into account a predetermined virtual texturing pattern and improving the realism of the haptic feedback based on which the user perceives the texturing pattern by touching the device. A particular application of the device is a haptic interface.

BRIEF SUMMARY

A first subject of the disclosure is a method for implementing a touch device, the touch device comprising:
- a plate comprising at least one texturing area, to which is assigned a virtual texturing pattern, the plate being intended to be touched by an external body;
- at least one transducer configured to vibrate the plate at an ultrasonic vibration frequency, the transducer being configured to be controlled by an activation signal;

the method comprising:
  a) moving an external body along the texturing area;
  b) determining a position of the external body on the texturing area;
  c) measuring a speed of the external body along the plate;
  d) when the finger moves along the texturing area, generating an activation signal, depending on the texturing pattern, so as to activate the transducer, or each transducer, such that the activation signal results in the plate being vibrated in line with a preferably ultrasonic vibration, the vibration giving rise to a change in the friction between the plate and the external body, the moving external body feeling the texturing pattern as a result of its movement along the texturing area.

the texturing pattern is oriented relative to a reference axis;

step c) comprises measuring a component of the speed of the external body on the reference axis;

during step d), the activation signal depends on the texturing pattern and the component of the speed of the external body on the reference axis;

such that when the finger moves along the texturing area, the friction between the plate and the external body is changed on the basis of the position of the external body on the texturing area and on the basis of the component of the speed of the external body on the reference axis.

The vibration at an ultrasonic frequency produces an ultrasonic lubrication effect between the external body and the plate.

Virtual texturing pattern is understood to mean a texturing pattern defined digitally, independently of an actual texturing or a surface condition of the plate.

The vibration gives rise to an impression of texturing that is experienced by the external body touching the texturing area. The vibration constitutes haptic feedback from the device, resulting in a touch sensation being altered.

Ultrasonic vibration is understood to mean a vibration whose frequency is greater than or equal to 20 kHz. The vibration frequency is preferably less than 200 kHz.

In step d), the activation signal can be created from:

a periodic carrier, the carrier extending, in each period, over an amplitude;

a modulation function that changes, during the movement of the finger, according to a temporal shape depending on the texturing pattern and the speed component of the external body on the reference axis;

so that the amplitude of the activation signal results from a modulation of the carrier by the modulation function.

According to one possibility, in step d), the activation signal depends on the texturing pattern and the speed of the external body on the texturing area. The temporal shape of the modulation function depends on the speed of the external body over the texturing area.

During step d), the activation signal can be generated at different instants, so that:

at each instant, the amplitude of the modulation function depends on the position of the external body;

between two successive instants, the temporal shape of the modulation function is adjusted on the basis of a change in the speed component of the external body on the reference axis.

According to one embodiment:

the external body moves along the texturing area in a direction forming an angle with the reference axis;

the temporal shape of the modulation component depends on the angle between the direction and the reference axis.

The texturing pattern can be a periodic pattern that extends over a spatial period parallel to the reference axis. The temporal shape of the modulation function is then periodic over a time period, the length of the time period depending on the component of the speed of the external body on the reference axis and the spatial period of the texturing pattern.

According to one embodiment:

the texturing pattern is oriented relative to a first reference axis and to a second reference axis;

step c) comprises measuring a first speed component over the first reference axis and a second speed component over the second reference axis;

step d) comprises, during the movement of the external body:

generating a first activation signal that is formed by a first periodic carrier modulated by a first modulation function, the temporal shape of the first modulation function depending on the first speed component;

generating a second activation signal that is formed by a second periodic carrier modulated by a second modulation function, the temporal shape of the second modulation function depending on the second speed component;

combining the first activation signal and the second activation signal to form the activation signal.

According to one possibilty:

the texturing pattern is a periodic pattern that extends over a first spatial period parallel to the first reference axis;

the first modulation function is periodic over a first time period, the length of the first time period depending on the first component of the speed and the first spatial period of the periodic pattern;

the texturing pattern extends over a second spatial period parallel to the second reference axis;

the second modulation function is periodic over a second time period, the length of the second time period depending on the second component of the speed and the second spatial period of the periodic pattern.

According to one embodiment:

the texturing pattern comprises at least one notch, the notch corresponding to a relief or to a hollow in the texturing pattern;

the modulation function of the activation signal is determined such that a notch effect is experienced by the user when the external body passes over the notch.

Preferably, when the external body passes on either side of the notch, the modulation function successively comprises:

an anterior phase, when the external body approaches the notch;

a notch phase, when the external body crosses the notch;

a posterior phase, when the external body moves away from the notch.

The feeling of the notch by the user then depends on the modulation function during the anterior, notch and posterior phases.

The modulation function is preferably such that in the notch phase the modulation function changes over a wider range of variation than in the anterior phase and in the posterior phase.

Additionally or alternatively, in the notch phase the modulation function can be such that an absolute value of its time derivative reaches a higher maximum value than in the anterior phase and in the posterior phase.

According to one possibilty:

the notch is oriented relative to the reference axis;

the length of the anterior phase, the notch phase and the posterior phase depends on the component of the speed of the external body relative to the reference axis.

The texturing pattern can have multiple notches. The modulation function can be such that each notch has an associated anterior phase, notch phase and posterior phase. The anterior phase, the notch phase and the posterior phase form an activation sequence associated with each notch.

According to one possibility:

the notches are distant from each other along the reference axis;

the time interval between two notch phases, which are respectively associated with two successive notches, depends on a distance between the two notches and a speed of the external body relative to the reference axis.

Regardless of the embodiment, the reference axis can be linear or curved or piecewise linear.

According to one embodiment:
the device is a touch interface that is intended to control an apparatus connected to the interface;
the interface is intended to adjust a value of at least one operating parameter of the apparatus on the basis of the position of the external body on the texturing area, the texturing area allowing the value of the parameter to be adjusted;
the method comprises generating a control signal for the apparatus on the basis of the position of the finger on the texturing area.

According to one embodiment, the device comprises a pressure sensor configured to measure a pressure exerted by the external body on the plate, the method comprising:
measuring a pressure exerted on the plate;
comparing the measured pressure with a predetermined threshold;
implementing steps c) and d) when the pressure exerted is greater than the threshold.

According to one embodiment, step b) is implemented using a capacitive sensor.

According to one embodiment, the external body is a finger.

A second subject of the disclosure is a touch device comprising a plate that is intended to be touched by an external body, the device comprising:
at least one transducer configured to vibrate the plate;
a position sensor configured to generate a position signal, the position signal representing a position of the external body on the plate;
a calculation unit for determining a speed signal on the basis of position signals that are respectively generated at different instants, the speed signal representing a speed of the external body along the plate;
the touch device being characterized in that it comprises:
a control unit that is connected to the position sensor and to the calculation unit and configured to implement step d) of a method according to the first subject of the disclosure on the basis of the position signal from the position sensor and the speed signal from the calculation unit.

The calculation unit can be connected to a memory that stores the texturing pattern, assigned to the texturing area, in digital form. The memory can have different texturing patterns that can be successively assigned to the texturing area.

The position sensor can be a capacitive sensor and comprise a network of conductive tracks configured to detect the external body by capacitive coupling through all or part of the plate.

The device can comprise a screen. The device can be such that:
the plate is transparent;
the plate is arranged against the screen.

The device can be such that:
the device is a touch interface that is intended to control an apparatus connected to the interface;
the device comprises a texturing area that is intended for adjusting a value of an operating parameter of the apparatus, the texturing area comprising at least two notches that are spaced apart from one another;
the control unit is configured to adjust a value of the parameter on the basis of a position of the finger on the texturing area.

A third subject of the disclosure is an apparatus configured to be controlled by a parameter and comprising a touch interface that is configured to select the parameter or to set a value of the parameter, the touch interface being a device according to the second subject of the disclosure. The device comprises a texturing area that is intended for adjusting a value of an operating parameter of the apparatus, the texturing area comprising at least two notches that are spaced apart from one another, the control unit being configured to adjust a value of the parameter on the basis of a position of the finger on the texturing area.

The disclosure will be better understood on reading the account of the examples of embodiments that are presented, in the rest of the description, with reference to the figures listed below.

BRIEF DESCRIPTION OF THE DRAWINGS

FIG. 3A shows the texturing pattern of FIG. 2A and also three directions of movement of the finger on the pattern.

FIG. 3B shows two temporal shapes of the modulation function, one for a direction parallel to a reference axis and one for a direction inclined relative to the reference axis.

FIG. 4A shows a second example of a virtual texturing pattern assigned to a texturing area.

FIG. 4B shows a modulation function that allows the texturing pattern shown in FIG. 4A to be felt.

FIG. 8A shows a modulation function allowing a notch to be felt.

FIG. 8B is a time derivative of the modulation function illustrated in FIG. 8A.

FIGS. 9A to 9H show different possibilities for modulation functions allowing a notch to be felt.

DETAILED DESCRIPTION

FIGS. 1A to 1D show an example of a touch device 1 according to embodiments of the disclosure. The touch device comprises a plate 10 intended to be touched by an external body 9. In the examples shown in this disclosure, the external body 9 is a finger, which is consistent with most of the applications envisaged. Alternatively, the external body 9 can be a stylus, or any other means allowing the plate 10 to be acted on.

The device 1 is intended to produce haptic feedback for an external body moving along the plate. More precisely, the device is configured in such a way that a movement along the plate results in the external body being able to experience an impression of texturing.

Figure 2A:
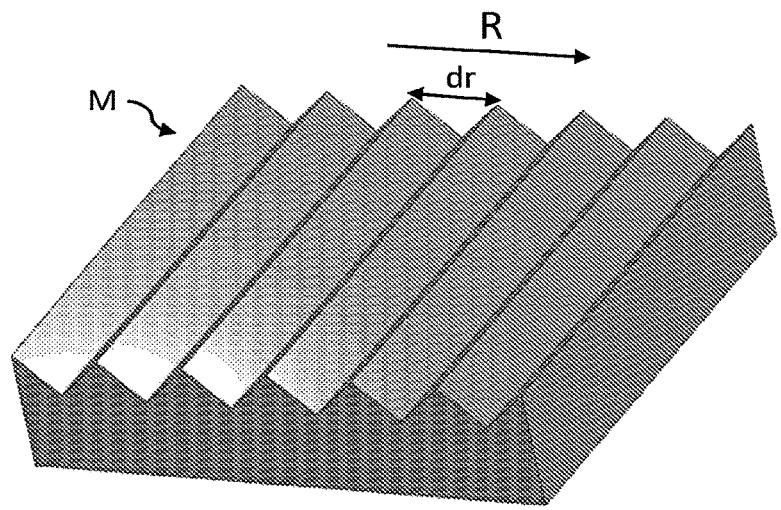
FIG. 2A shows a first example of a virtual texturing pattern assigned to a texturing area.

The plate 10 comprises a texturing area 10' to which a texturing pattern M is assigned. The texturing pattern M is virtual: it does not correspond to a physical or material structuring of the plate. In other words, the texturing pattern is defined independently of a surface condition of the plate in the texturing area. The plate can be smooth, for example, while the texturing pattern defines a roughness. An example of a texturing pattern M is shown in FIG. 2A.

The plate 10 is rigid. It extends between an outer face $10_e$ and an inner face $10_i$. The outer face $10_e$ is accessible to the finger 9. The inner face $10_i$ and the outer face $10_e$ preferably extend parallel to each other. The distance between the outer face $10_e$ and the inner face $10_i$ defines a thickness e of the plate. The thickness e of the plate is dimensioned to allow vibration of the plate 10 according to an ultrasonic vibration, as described below. The thickness e of the plate 10 is preferably less than 10 mm, or even less than 5 mm. The thickness e is adjusted on the basis of the nature of the material and its mechanical properties (rigidity, solidity). It is, for example, between 1 mm and 5 mm for glass or a material such as Plexiglas.

In the example shown, the inner face $10_i$ and the outer face $10_e$ are flat, which is consistent with the simplest configuration to manufacture. The plate extends, parallel to a lateral axis X, over a width l and, parallel to a longitudinal axis Y, over a length L. The length L and the width l may be between 5 cm and a few tens of cm, for example 30 cm, or even more. The lateral axis X and the longitudinal axis Y define a principal plane $P_{XY}$. In other examples, the inner face $10_i$ and/or the outer face $10c$ can be curved. The surface area of the plate 10 is preferably greater than 10 cm², or even 50 cm².

The plate 10 is formed from a rigid material, such as glass, or a polymer, or wood, or a metal, or a semiconductor, for example silicon. The plate 10 can be transparent or opaque. The plate 10 can comprise opaque parts and transparent parts.

In this example, the plate 10 is delimited over the lateral axis X by a first lateral edge $10_i$ and a second lateral edge 102, in the vicinity of which are arranged transducers 12. In the vicinity is understood to mean at a distance of preferably less than 2 cm, on or under the plate 10. Each transducer 12 is capable of being activated by an electrical activation signal, and, as a result of the activation signal, of exerting a pressure on the plate 10 so as to produce a local deformation of the plate, in a direction perpendicular to the plate. When the activation signal is periodic, in an ultrasonic frequency range, the deformation of the plate 10 is periodic, leading to the formation of an ultrasonic vibration 19. The vibration can notably be produced by a bending wave forming through the plate. The bending wave can be a standing wave or a progressive wave. Consequently, the activation signal for each transducer can be amplitude and/or frequency modulated. Preferably, the plate is connected to a plurality of transducers 12. The transducers are generally arranged in the vicinity of at least one edge of the plate 10, and preferably in the vicinity of two opposite edges relative to the lateral axis X and/or the lateral axis Y. The arrangement of the transducers 12 at the edge of the plate 10 is not a necessary condition: the transducers can be arranged in other configurations, for example in the form of a row, in the middle of the plate, or of a matrix.

The fact that the vibration frequency is ultrasonic makes the vibration imperceptible, except to the external body 9 moving on the outer face of the plate.

Each transducer 12 can be a transducer of the piezoelectric type comprising a piezoelectric material, for example AlN, ZnO or PZT, arranged between two electrodes. For example, each transducer 12 can be the PZT reference 406. Alternatively, each transducer can be an electromechanical resonator, for example of the MEMS (Micro ElectroMechanical System—electromechanical microresonator) type, or of the electrostrictive or magnetostrictive type. The transducers 12 can be such that the piezoelectric material is deposited, in the form of one or more thin layers, between bias electrodes.

Each transducer 12 can be joined to the inner face $10_i$ of the plate 10 by adhesive bonding. The transducers are connected to the inner face $10_i$ mechanically: they can be joined to the inner face directly, or can be joined to an intermediate, preferably rigid, component, the latter being joined to the inner face $10_i$ so as to allow transmission, to the plate, of the vibration brought about by the or each transducer.

The intermediate component can be metallic. It may, for example, be a part forming an amplifier, arranged between the plate and a transducer 12 (or each transducer 12), and designed to amplify the vibration produced by the transducer 12 (or each transducer 12) and transmitted to the plate 10. The intermediate component can form a rigid layer so as to increase the rigidity of the plate. The intermediate component can be a screen 11, joined to the plate 10, as described below. The plate 10 can form a protection slab for the screen 11. The screen 11 can be a screen of LCD (Liquid Crystal Display) or OLED (Organic Light-Emitting Diode) type. The intermediate component can be a multilayer component. It may, for example, comprise a screen under which is placed a part forming an amplifier, the transducers being joined to the amplifier.

Generally, each transducer 12 is configured to generate an ultrasonic vibration 19, the latter propagating in the plate 10. The frequency of the ultrasonic vibration 19 is preferably between 10 kHz and 200 kHz. It is preferably greater than 20 kHz so as to relate to the ultrasonic spectral band, and preferably less than 150 kHz. The amplitude of the ultrasonic vibration 19 is generally between 0.1 μm and 50 μm. FIG. 1D has outlined an ultrasonic vibration 19 propagating in the plate 10. As is known in the field of haptic feedback interfaces, the ultrasonic vibration of the plate leads to the formation of a thin film of air between the plate 10 and the finger 9 (known as the "squeeze film effect," or ultrasonic lubrication), leading to the impression of texturing on the plate when the user's finger moves along the outer face $10_e$. The vibration of the plate results in the thickness of the air film changing, which increases or decreases a lubrication effect between the finger and the plate. This alters the friction between the plate and the finger, as described in the prior art. This results in the touch sensation perceived by the finger being altered. The ultrasonic vibration 19 can be stationary, but it need not be.

The device 1 comprises a position sensor 14 that can be used to form a signal S(t), known as a position signal, depending on a position of the finger 9 on the plate 10. It may be a capacitive sensor, for example. In this example, the plate 10 is made of a dielectric material, and the position sensor 14 is connected to conductive tracks 13 arranged in a two-dimensional network. The conductive tracks 13 are adjacent to the inner face $10_i$. The conductive tracks can extend parallel to the plate 10, below the outer face $10_e$. In the example shown, the conductive tracks are formed on a capacitive screen 11 and arranged adjacent to the inner face $10_i$. The position sensor can be used to determine a position of the finger at a sampling frequency that can reach or exceed 50 Hz or 100 Hz.

When the plate 10 is opaque, the conductive tracks 13 can be made from a common conductive material, for example a metal. When the plate 10 is transparent, the conductive tracks 13 are preferably made from a transparent conductive material, for example a conductive oxide, a common material being ITO (Indium-Tin Oxide). The network formed by the conductive tracks 13 can be of matrix type, the tracks being rectilinear and extending in rows and columns. The conductive tracks can be biased in line with a bias voltage.

The conductive tracks 13 can be formed directly on the plate 10 or in the plate 10.

Since the finger 9 is electrically conductive, proximity between one or more conductive tracks 13 can result in a charge transfer being carried out, using the capacitive effect, between one or more conductive tracks 13 and the finger 9. It should be noted that a detection of a position using capacitive coupling assumes that the plate 10 is touched by an electrically conductive body 9 (finger or, for example, metallic, conductive stylus).

Figure 1A:
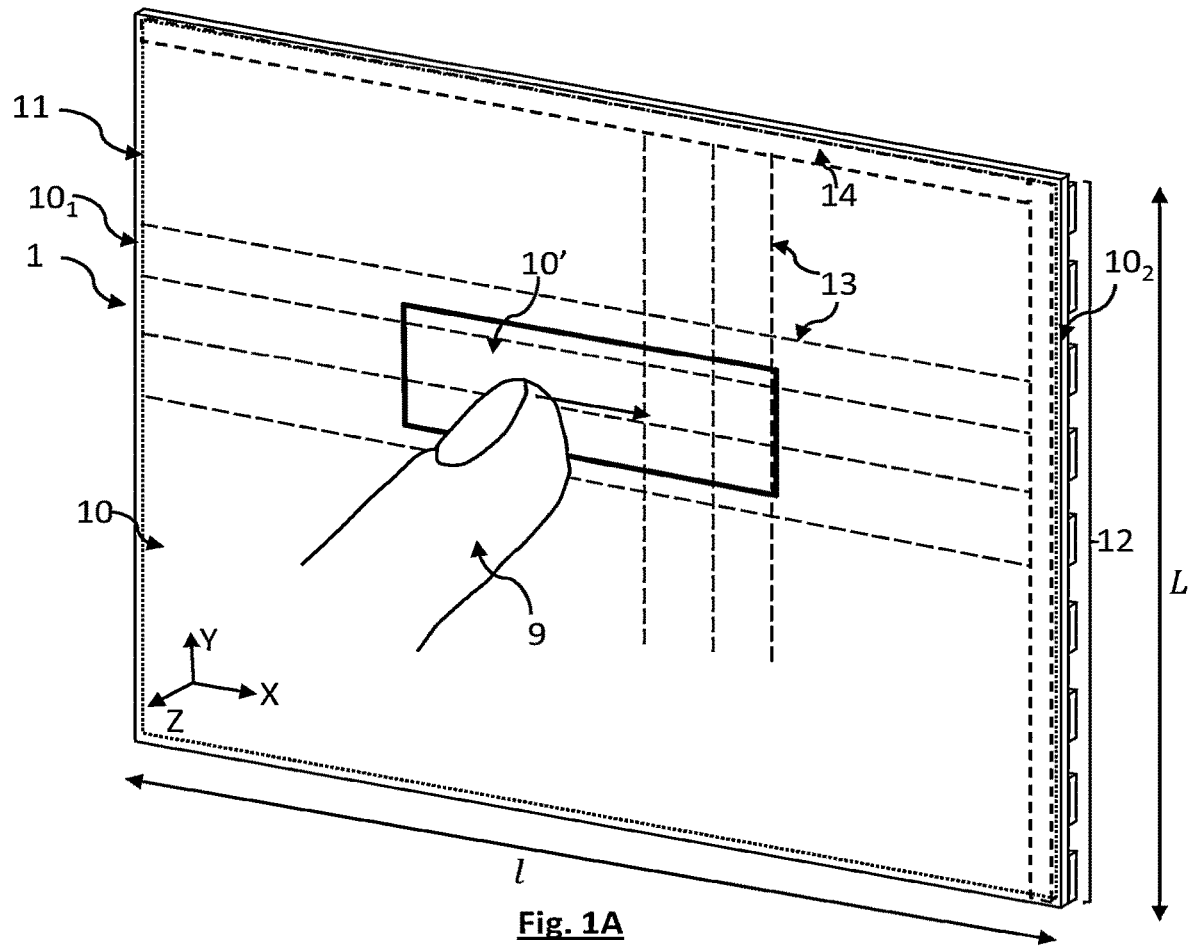
FIGS. 1A to 1C show an example of a touch device that can be used to implement the disclosure.
Figure 1B:
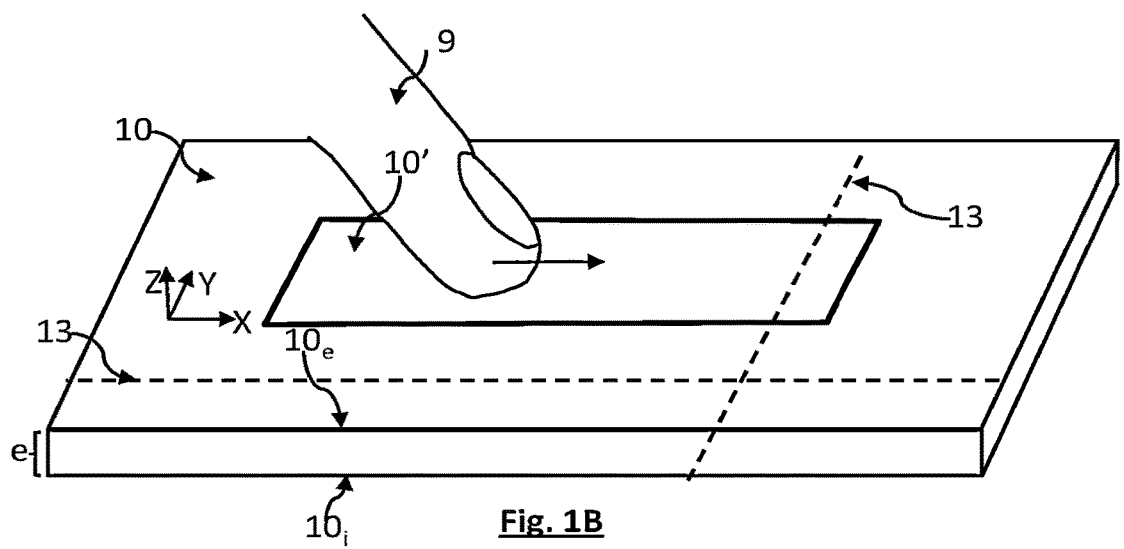
Figure 1C:
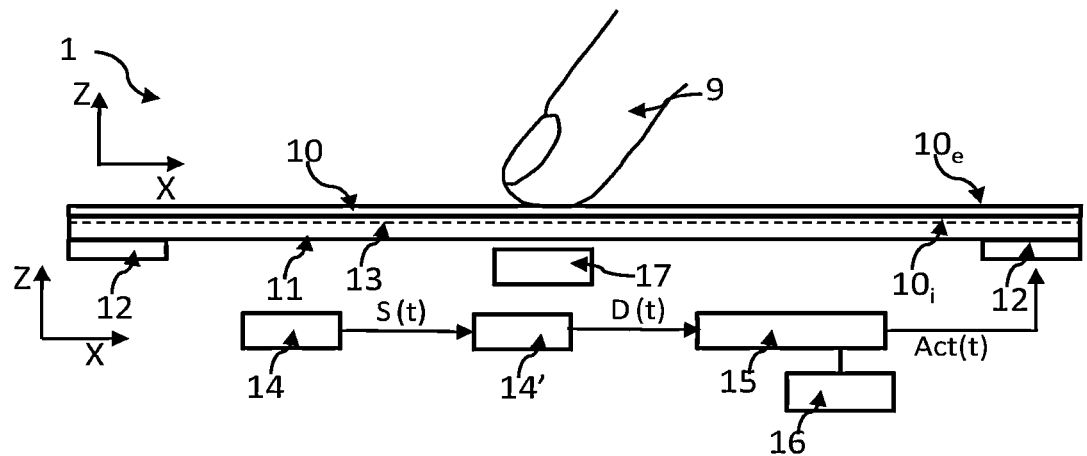
Figure 1D:
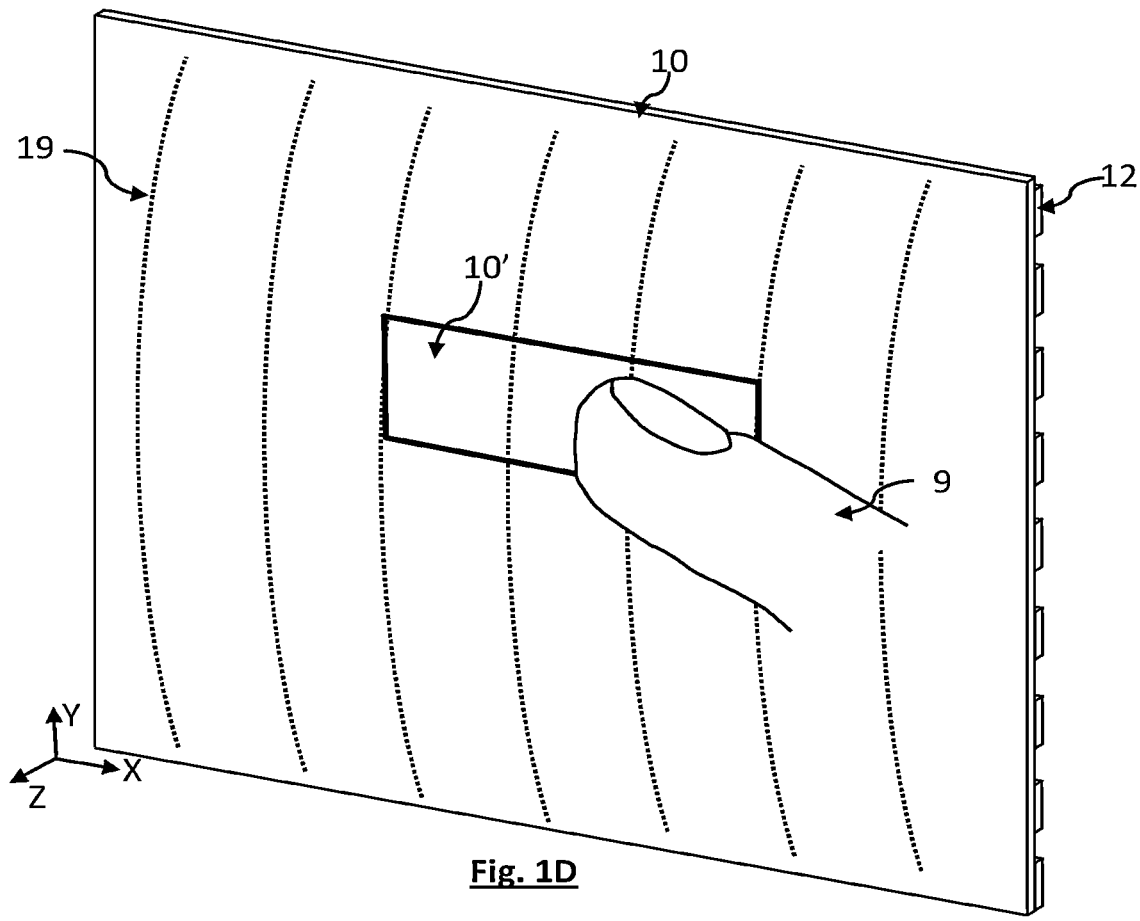
FIG. 1D outlines a propagation of an ultrasonic vibration through a plate of the touch device described with reference to FIGS. 1A to 1C.

FIGS. 1A, 1B and 1C show the conductive tracks 13 by way of dashes because they are located behind the plate 10.

Other components of the touch device have been outlined in FIG. 1C. The conductive tracks 13 are connected to the position sensor 14. Due to the two-dimensional arrangement of the conductive tracks 13, the position sensor 14 can be used to obtain two-dimensional coordinates (x, y) for the point of contact of the finger, parallel to the plate 10. The position sensor 14 is connected to a calculation unit 14' that can be used to create a speed signal V(t) for the finger from positions of the finger that are obtained at a measurement instant t and at a different instant, before or after the measurement instant t, respectively. The speed signal V(t) represents the speed of the finger at the measurement instant.

The touch device 1 can comprise a pressure sensor 17 configured to estimate a pressure exerted on the plate 10 by the finger 9. The pressure sensor 17 can be:

a rangefinder arranged facing the plate and configured to measure a distance separating it from the plate, the rangefinder being configured to determine a deformation of the plate as a result of a pressure exerted on the plate, this being consistent with the example shown in FIG. 1C. It may be an infrared optical rangefinder, for example, whose operating range is between 1 and 5 mm and that is arranged 2.5 mm from the plate. Such a rangefinder is commonly referred to as a "reflective object sensor." For example, the reference sensor QRE 1113 is suitable for such an application or a strain gauge designed to deform as a result of a deformation of the plate as a result of a pressure exerted on the plate;

or a dynamometer that is arranged in contact with the plate and configured to detect a movement of the plate as a result of a pressure exerted on the plate;

or a transducer configured to measure a change in a vibration of the plate, the change resulting from a pressure exerted on the plate. The transducer can be used to measure the pressure exerted as described in the patent application EP3566115.

The presence of the pressure sensor 17 is optional.

The device 1 comprises a control unit 15 that is connected to the position sensor 14 and to the calculation unit 14'. The control unit 15 comprises a microcontroller or a microprocessor. The control unit 15 is set up or programmed to perform the actions described below. The control unit 15 is connected to a memory 16 that stores at least one digital texturing pattern M assigned to the texturing area 10'. The virtual texturing pattern is created in a digital form, independently of the surface condition of the texturing area (roughness or presence of any relief), hence the name virtual pattern. As explained below, multiple texturing patterns can be assigned, at different instants, to the same texturing area. In this case, a library of texturing patterns is stored in the memory 16.

The control unit 15 is configured to send, at different instants t, an activation signal Act(t) to at least one transducer 12, and preferably to each transducer 12, on the basis of the speed V(t). The desired objective is to obtain haptic feedback from the device 1, sent to the user, when the finger moves along the texturing area 10'. On the basis of the activation signal, each activated transducer can generate an ultrasonic vibration 19 that forms through the plate 10 and reaches the user's finger 9, as shown in FIG. 1D. The ultrasonic vibration results in the user experiencing a sensation of texturing, corresponding to the pattern assigned to the texturing area, based on the principles described hereinabove. Thus, in the absence of an activation signal, a texturing area can be experienced as untextured, whereas the activation signal results in a finger that is moving in contact with the texturing area perceiving the texturing defined by the texturing pattern M.

Figure 2B:
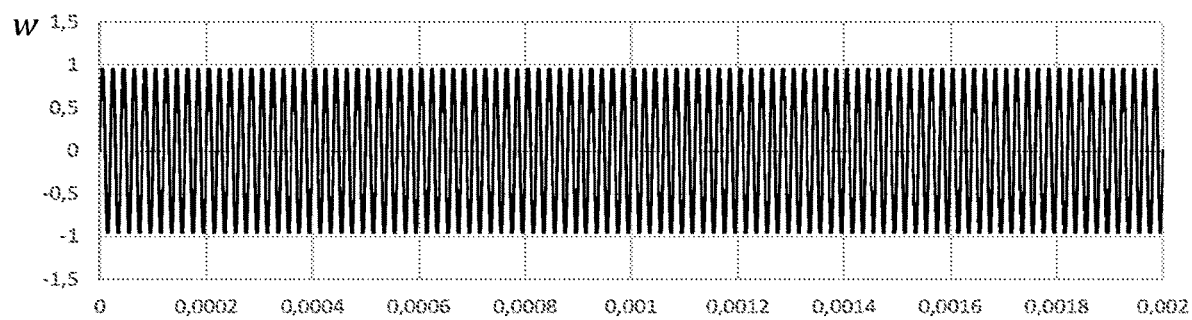
FIGS. 2B to 2C illustrate a transducer activation signal causing the plate to vibrate so as to give rise to the texture according to the texturing pattern of FIG. 2A. The activation signal comprises a carrier signal (FIG. 2B) and a modulation function (FIG. 2C).
Figure 2C:
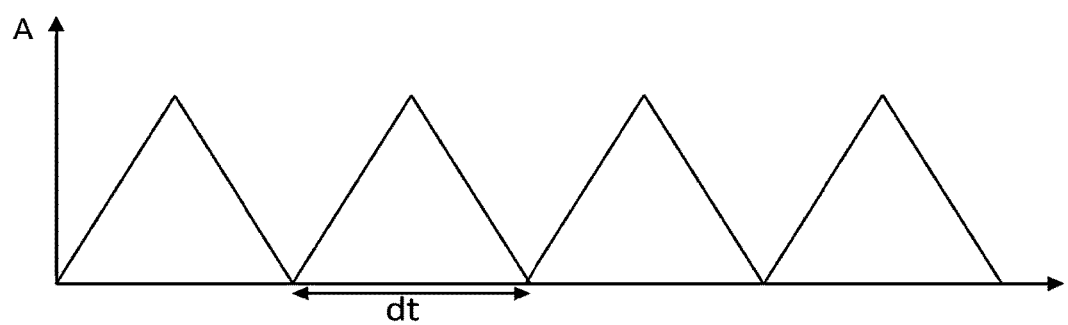

FIG. 2A is an example of such a virtual texturing pattern M. The texturing shown in FIG. 2A is not real. It is consistent with what the finger 9 moving along the texturing area 10' perceives as a result of the activation signal. So that the finger 9 can feel the texturing pattern, the activation signal Act(t) is formed by an amplitude-modulated periodic signal known as a "carrier" signal w. FIG. 2B shows the carrier signal: it is a periodic signal, the period corresponding to an ultrasonic frequency, that is to say between 20 kHz and 200 kHz. In this example, the carrier is sinusoidal. FIG. 2C shows a triangular modulation function A allowing amplitude modulation of the carrier so as to form the activation signal Act(t) such that:

$$\text{Act}(t) = A(t) \times w(t) \tag{1}$$

During carrier modulation, the modulation function A takes a predetermined temporal shape that is defined on the basis of the virtual pattern M. Temporal shape is understood to mean the evolution of the modulation function over time during the movement of the finger on the texturing area. The finger moves along the texturing area for a movement time. The temporal shape corresponds to the evolution of the modulation function during the movement time.

The pattern M shown in FIG. 2A is periodic, with a spatial period dr, over a reference axis R. The periodic pattern is formed by a repetition, in space, of an elementary pattern. Spatial period is understood to mean a distance over which the elementary pattern repeats, parallel to the reference axis. The reference axis R corresponds to an axis over which the spatial period of the pattern is repeated. The reference axis R is parallel to the plate 10; it can be mistaken for the lateral axis X or the longitudinal axis Y defined previously. It can also be different from these axes. When the texturing pattern M is periodic, the modulation function is also periodic, with the time period dt. The time period depends on the spatial period and the speed of movement of the finger and preferably the direction of movement of the finger, as described below. In FIG. 2C, the modulation function A takes a periodic triangular temporal shape.

The activation signal Act(t) corresponding to the texturing pattern M is activated when the finger is in contact with the texturing area 10'. The control unit 15 is programmed to generate the activation signal Act(t) on the basis of the position S(t) detected by the position sensor 14 and on the basis of the texturing pattern M stored in the memory 16.

An important aspect of the disclosure is that the activation signal depends not only on the position of the finger on the plate 10, but also on its speed V(t). More precisely, the temporal shape of the modulation function is adjusted on the basis of the speed of the finger $V_R(t)$ on the reference axis R. In the example of FIG. 2C, the period dt of the modulation function is all the smaller as the speed V(t) is high:

$$dt = \frac{dr}{V_R(t)} \tag{2}$$

The texturing pattern M is oriented relative to the reference axis R. "Oriented" is understood to mean that the texturing is variable along the reference axis. When the pattern is periodic, the texturing repeats along the reference axis. The activation signal, and more precisely the temporal shape of the modulation function, depends on an orientation of a trajectory followed by the finger relative to the reference axis R. The control unit is configured to:
  calculate a component $V_R$ of the speed V of the finger on the reference axis R;
  adapt the temporal shape of the modulation function on the basis of the component $V_R$ thus calculated.

FIG. 3A shows the texturing pattern M as shown in FIG. 2A. The pattern is oriented over a reference axis R. In this example, the pattern is periodic over the reference axis R. Three trajectories have been shown: a trajectory D that is parallel to the reference axis R; a trajectory D' that is oriented relative to the axis R at an angle of 30°, and a trajectory D" that is orthogonal to the axis R. According to this embodiment, the activation signal is configured using a projection $V_R$ of the speed of the finger on the axis R. Projection on the axis R is understood to mean a projection perpendicular to the axis R. More precisely, the period dt of the modulation function changes on the basis of the value of the speed of the finger that is projected on the axis R. Thus, the modulation is performed on the basis of the angle between the trajectory (D, D', D") and the reference axis R. The angle can be determined by the position sensor. The lower the speed of the finger that is projected on the axis R, the more the period dt of the modulation function increases.

At each instant t, the amplitude of the activation signal is defined by the amplitude of the modulation function: the latter depends on the position of the finger on the texturing area 10' and the virtual pattern M. Between two successive instants, the temporal shape of the modulation function can be adjusted on the basis of a possible change in the speed of movement of the finger along the texturing area 10'.

The modulation function A(t) has been shown in FIG. 3B:
  when the finger moves, at constant speed, over the trajectory D, parallel to the reference axis R: the period of the modulation function is dt. This corresponds to the solid curve.
  when the finger moves, at the same speed, over the trajectory D': the period of the modulation function is dt', with dt'>dt. This corresponds to the dashed curve.
  When the finger moves over the trajectory D", the projection of the speed over the R axis is zero. No activation signal is sent.

FIG. 4A shows a texturing pattern simulating the outline of a button of the pushbutton type. FIG. 4A is a sectional view simulating a button as felt when the finger slides along the texturing area 10' over the axis R. The relief sensation perceived by the finger when it moves along the texturing area has been shown in FIG. 4A, at four instants $t_a$, $t_b$, $t_c$ and $t_d$. In reality, the finger moves along the texturing area 10', which is smooth, for example. FIG. 4A shows the virtual texturing felt by the finger. It is assumed that the pressing force of the finger that is exerted by the user is constant.

FIG. 4B shows a temporal shape of a modulation function that can be used to obtain an activation signal conferring a feeling of a button touch. The temporal shape of the modulation function comprises two Gaussian peaks separated by a flat portion of zero amplitude. The two Gaussian peaks are separated by a length of time Δt. Each Gaussian peak corresponds to an edge of the button.

When the position of the finger reaches the first edge of the virtual button (instant $t_a$), the modulation amplitude increases. This leads to a reduction in the friction of the finger on the plate 10: this results in a brief acceleration of the finger. When the position of the finger heads for the top of the button of the virtual pattern (instant $t_b$), the modulation amplitude decreases, increasing the friction of the finger on the plate 10. This results in the finger decelerating. The user perceives a rising action by the finger on the button. When the position of the finger corresponds to a position at the top of the virtual button (instant $t_c$), the modulation amplitude is constant, being zero (instant $t_c$), for example. The friction is high. When the position of the finger corresponds to an opposite edge of the virtual button (instant $t_d$), the modulation amplitude increases. This leads to a reduction in the friction between the finger and the plate 10: this results in the finger briefly accelerating. The user perceives a fall by the finger.

The sensation of perceiving a rise and a fall can be accentuated when the user has a visual representation of the button on the texturing area.

The modulation function A, the temporal shape of which is shown in FIG. 4B, changes on the basis of a speed of movement of the finger over the reference axis R. The higher the speed, the more the length of time Δt between the Gaussian peaks decreases.

Figure 5A:
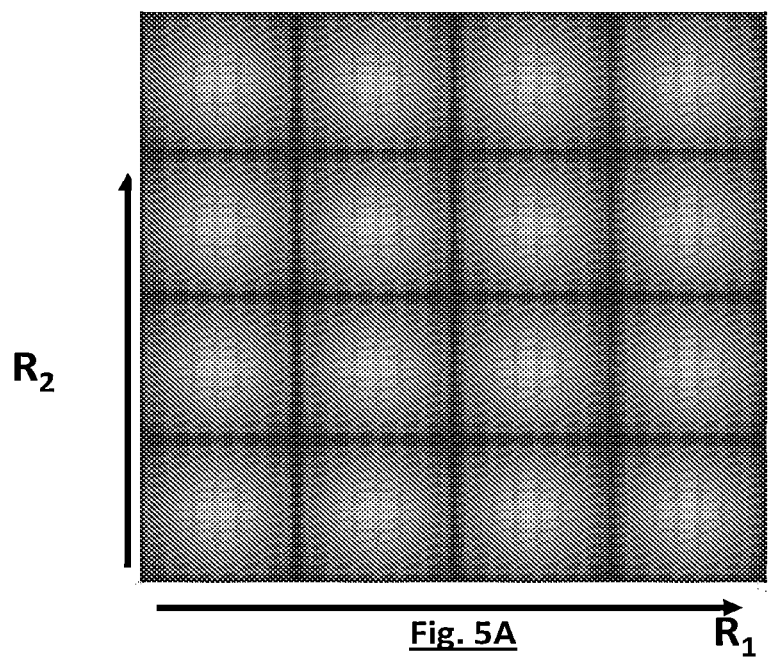
FIG. 5A shows a third example of a texturing pattern: in this example, the texturing pattern is defined over a first reference axis and a second reference axis.

In the embodiment illustrated in FIGS. 3A and 3B, the texturing pattern is periodic over a single reference axis, in this case the axis R. Therefore, the temporal shape of the activation function depends on the speed of the finger over the axis R. In another embodiment, as shown in FIG. 5A, the texturing pattern can be periodic over two axes, for example, two orthogonal axes: the axis $R_1$ and the axis $R_2$. Thus, the speed V(t) comprises:

a first component $V_{R1}(t)$, representing a speed of movement of the finger over the first axis, in this case the axis $R_1$;

and a second component $V_{R2}(t)$, representing a speed of movement of the finger over the second axis, in this case the axis $R_2$.

The activation signal Act(t) is obtained using a combination of a first periodic activation signal $Act_{R1}(t)$ over a first period, depending on the first component $V_{R1}(t)$;

a second periodic activation signal $Act_{R2}(t)$ over a second period, depending on the first component $V_{R2}(t)$.

Combination is understood to mean an arithmetic operation that can be a sum or a product, for example.

In FIG. 5A, the level of gray corresponds to the friction felt when the finger moves along the plate at constant speed.

The periodic activation signals $Act_{R1}(t)$ and $Act_{R2}(t)$ can have the same period and the same amplitude, which is consistent with the example given in FIG. 5A. They can also have a different period or amplitude: for example, the texturing is more pronounced (and/or more spaced apart) in one direction than in another direction.

Figure 6A:
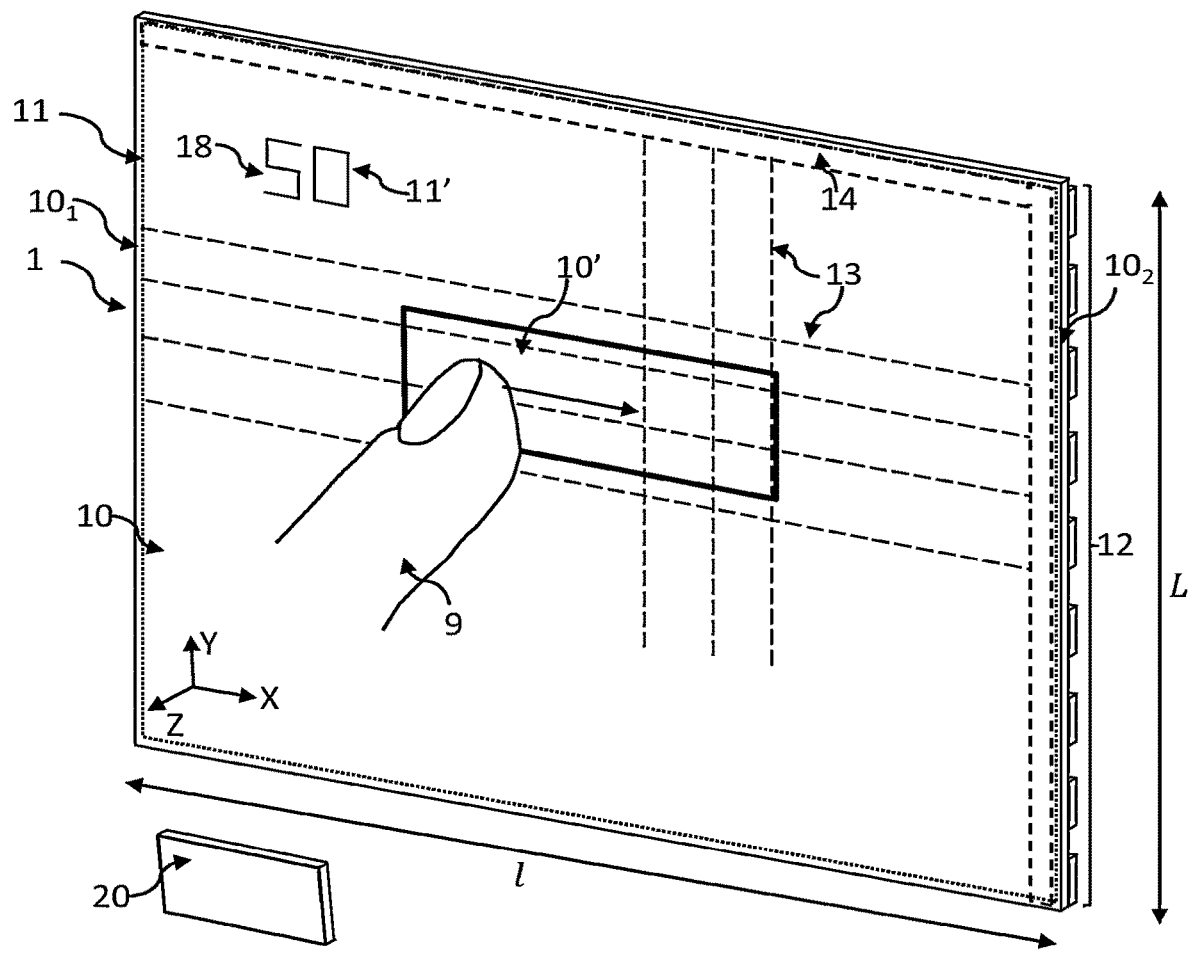
FIGS. 6A and 6B illustrate a configuration in which the touch device is an interface of an apparatus.
Figure 6B:
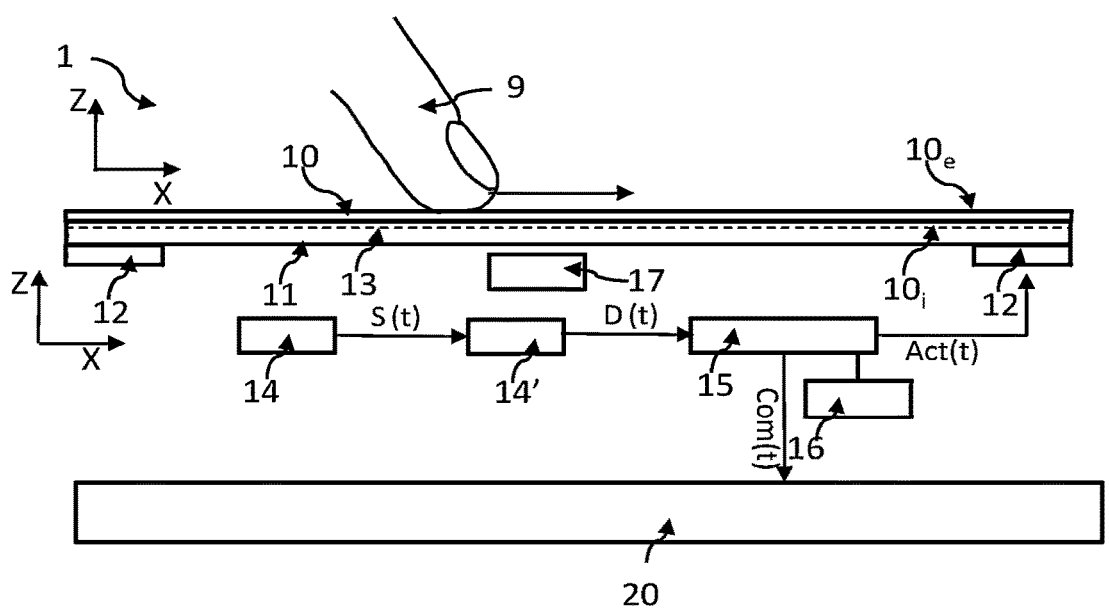

According to one embodiment, which is shown in FIGS. 6A and 6B, the device 1 is a haptic touch interface connected to an apparatus 20. The apparatus 20 can be, in a nonlimiting manner, a communication or computing apparatus, a machine, a domestic electrical appliance or a dashboard of a vehicle. The operation of the apparatus 20 is governed by at least one operating parameter 18. The haptic interface 1 is intended for setting a value of the operating parameter 18 of the apparatus 20.

For this purpose, the texturing area 10' forms a setting area intended for setting the parameter 18 as a result of the finger 9 sliding. The texturing area 10' extends between two ends, the latter corresponding to two different values of the parameter. The ends can correspond to two extreme values of the parameter 18, for example. In the example shown, the value of the parameter 18 is gradually increased when the finger slides along the texturing area, between the two ends, in the direction of the arrow, or gradually decreased when the finger slides in the opposite direction. A part 11' of a screen 11 located against the inner face $10_i$ of the plate 10 has been shown in FIG. 6A. In this example, the screen 11 can be used to display the parameter 18 on the part 11', the value of the parameter being adjusted by the finger 9 sliding over the texturing area 10'.

Figure 5B:
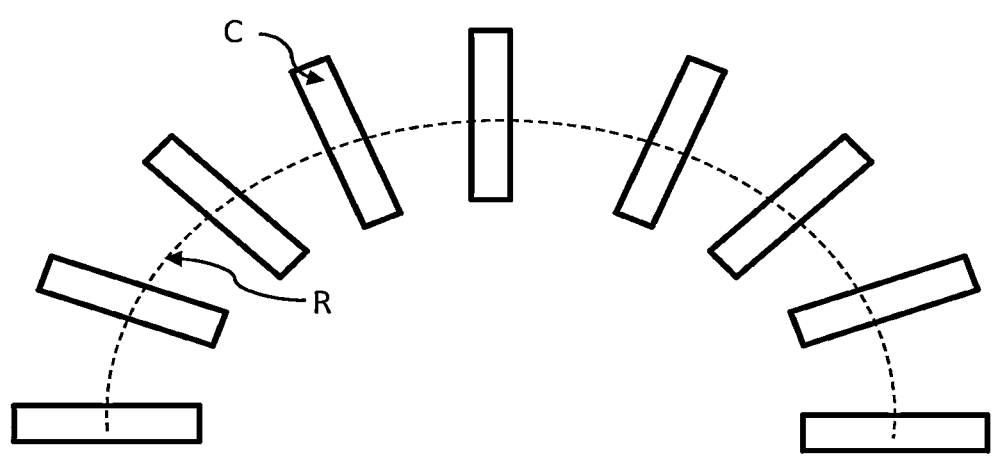
FIG. 5B shows an example in which the texturing pattern extends over a non-rectilinear reference axis.

In other examples, the texturing area 10' is not rectilinear. It extends over a reference axis R in the shape of a circular arc. An example is shown in FIG. 5B: the reference axis R is shown in dashes. According to other possibilities, the reference axis can comprise a succession of rectilinear parts by being piecewise linear. It can also comprise curved parts and other rectilinear parts.

The texturing area 10' can be used to switch the value of a parameter between just two values, for example 0 when the finger is located at one end of the texturing area and 1 when the finger is located at another end of the texturing area. It can be an on/off switch, for example. An example of a switch is described in connection with FIGS. 12A and 12B.

The sliding action of the finger along the texturing area 10' is similar to a translation action by a notched slider or to the rotation of a notched wheel in a conventional, non-haptic interface. In order to increase the realism of setting, the interface 1 is configured so that the finger 9 can experience a notch effect when it moves along the texturing area 10'. Notch effect is understood to mean an effect by which the finger, when sliding along the texturing area, experiences a haptic notch sensation comparable to the passing of mechanical notches that one perceives in acting on a mechanical notched slider or on a notched wheel. This involves mimicking a notch sensation that the finger would perceive if it acted on a notched mechanical slider. This results in an almost instantaneous change in the speed of the finger. The change in the speed of the finger corresponds to an acceleration or a deceleration. The change of speed is brought about by a change in the friction of the finger sliding along the interface. The change of friction is obtained by vibrating the plate, as detailed below.

On the basis of the speed signal V(t) transmitted by the calculation unit 14', the control unit 15 can send a control signal Com(t) to the apparatus 20. For example, when the interface 1 can be used to define a value of an operating parameter 18 of the apparatus 20, the control unit 15 is configured to transmit the value of the operating parameter 18 to the apparatus 20.

The inventors have designed activation signals that allow the perception of texturing patterns that are particularly suited to a notch feeling when the user's finger 9 slides along the texturing area 10'.

Figure 7A:
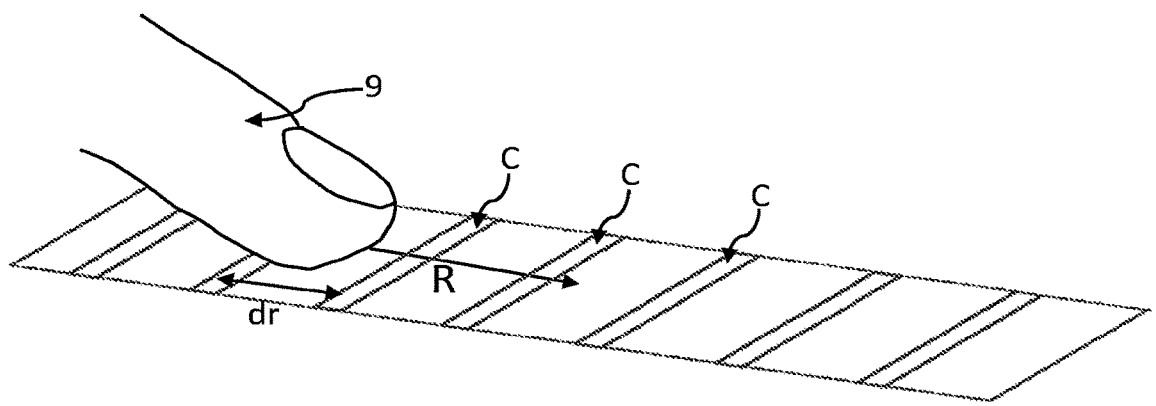
FIG. 7A shows a fourth example of a texturing pattern. In this example, the texturing pattern forms notches that are spaced apart from one another.
Figure 7B:
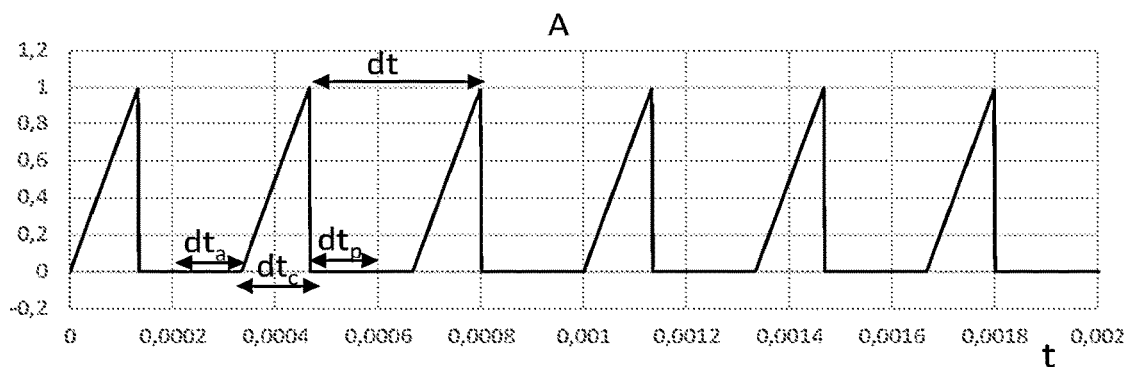
FIGS. 7B, 7C and 7D illustrate a modulation function, a carrier and a signal for activating the plate, resulting from an amplitude modulation of the carrier by the modulation function, respectively. The activation signal allows the notches shown in FIG. 7A to be felt.
Figure 7C:
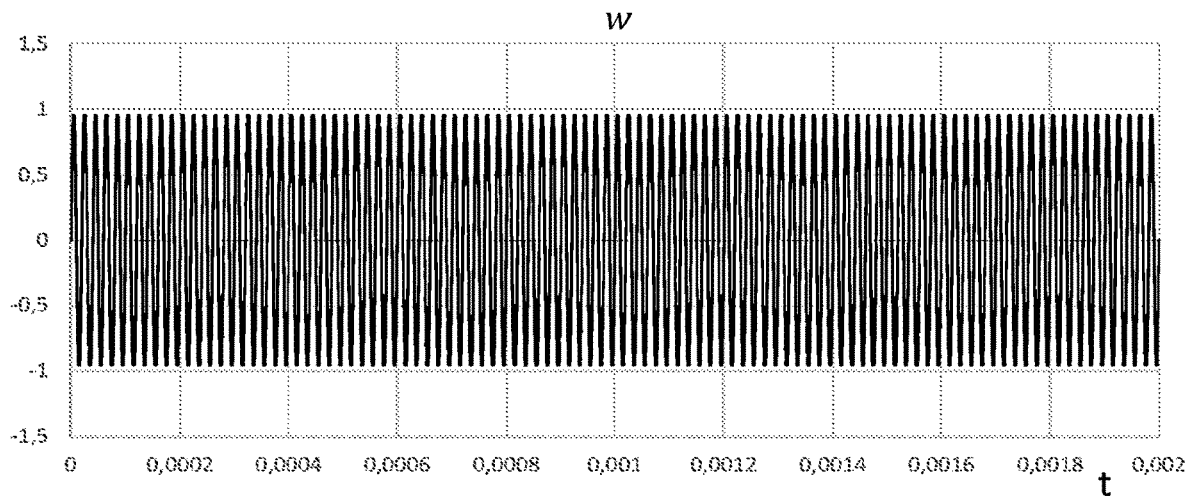
Figure 7D:
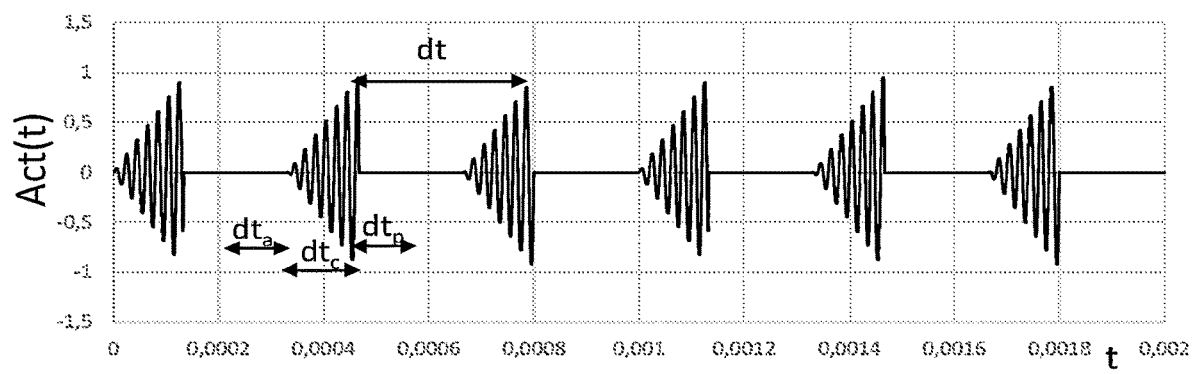

FIG. 7A shows a finger 9 moving along a texturing area 10'. The pattern M associated with the texturing area comprises notches C that are spaced apart from one another. According to a first possibility, which is shown in FIGS. 7A to 7D, the modulation function A is ascending-triangular. FIGS. 7B, 7C and 7D show a modulation function A, a sinusoidal carrier w and the activation signal Act, resulting from a sinusoidal carrier amplitude modulation by the modulation function, according to expression (1), respectively.

In each of these figures, the X-axis corresponds to time (unit: second) and the Y-axis corresponds to amplitude.

We can see that the temporal shape of the modulation function A comprises, for each notch:

an anterior time phase $dt_a$, occurring when the finger approaches the notch;

a notch time phase $dt_c$, occurring when the finger crosses the notch;

a posterior time phase $dt_p$, occurring when the finger moves away from the notch.

The anterior, notch and posterior time phases are activated successively. They define an activation sequence associated with the notch. Thus, for each notch, the modulation function comprises an activation sequence corresponding to the succession anterior phase, notch phase, posterior phase. The length of an activation sequence corresponds to the sum of the respective lengths of the anterior, notch and posterior phases.

Generally, each activation sequence corresponding to a notch is such that during the notch phase the amplitude of the modulation function changes within a significantly larger range of variation than in the anterior and posterior phases of the sequence. The modulation amplitude determines the friction of the finger on the texturing area 10'. The perception of a notch is realistic when, before and after the notch, the friction is relatively stable and when, at the time of the notch passing, the friction changes significantly. This results in a sudden change in the speed of the finger when the notch passes, leading to the user perceiving a notch. The sudden change in speed can be a deceleration, an acceleration or a combination of acceleration/deceleration. During the anterior and posterior phases preceding and following a notch, the change in the modulation amplitude is less than during the notch phase. During the anterior and posterior phases, the modulation amplitude can be stable, as shown in FIGS. 7B and 7D, without this being necessary. A stable modulation amplitude generates a sensation of flatness in the texturing area before or after a notch passes.

Thus, if $\Delta A(t)$ corresponds to the amplitude change, a notch time sequence can be such that:

$$\max_{dt_c}|\Delta A(t)| > \max_{dt_a, dt_p}|\Delta A(t)| \tag{3}$$

In the example of FIGS. 7B and 7D, during the notch phase $dt_c$, the modulation amplitude of the plate is gradually increased, leading to an increasing perception of sliding: the speed of the finger increases. The notch phase ends with a break, causing the finger to suddenly slow down. The combination of acceleration/deceleration gives rise to a notch being perceived.

A time sequence corresponding to a notch is preferably such that during the notch phase the absolute value of time derivative A'(t) of the modulation function has a higher maximum value than during the anterior and posterior phases. If A(t) corresponds to the modulation function:

$$\max_{dt_c}|A'(t)| > \max_{dt_a, dt_p}|A'(t)| \tag{4}$$

this reflects the fact that during the notch phase the modulation function undergoes a greater and/or faster amplitude change than during the anterior and posterior phases. This results in a faster and/or larger change in friction, giving rise to a notch being perceived by the finger.

A texturing pattern M forming one or more notches is generally oriented over a reference axis R, in the sense that each notch extends along the reference axis. The texturing area 10' to which the pattern is assigned preferably extends over the reference axis R. Two successive notches are spaced apart by a distance dr over the reference axis R. Consequently, the time interval dt between two successive notches is such that:

$$dt = \frac{dr}{V_R} \tag{5}$$

where $V_R$ is the speed of the finger parallel to the axis R. The higher the speed, the longer the time interval dt. It is also understood that the respective lengths of the anterior, notch and posterior phases change in the same way on the basis of the speed $V_R$.

Figure 7E:
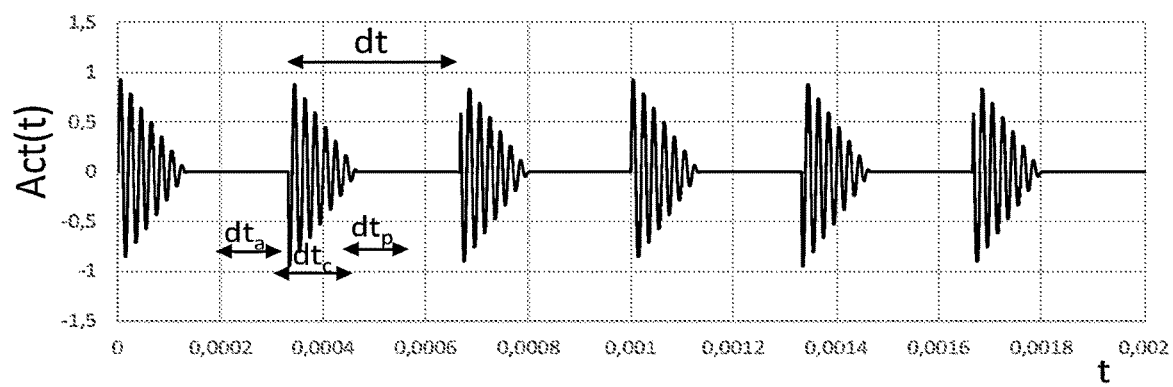
FIG. 7E shows another activation signal allowing the notches shown in FIG. 7A to be felt.

In FIGS. 7B and 7D, the modulation function is ascending-triangular. FIG. 7E illustrates another configuration, according to which the modulation function is descending-triangular.

Figure 7F:
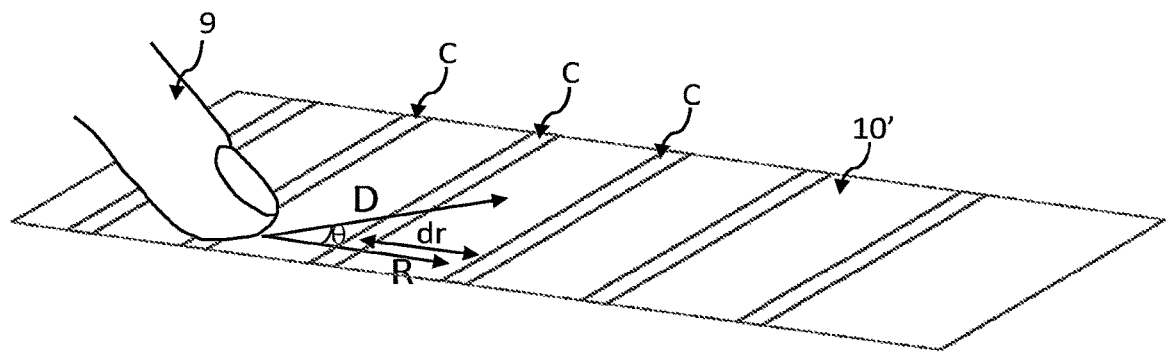
FIG. 7F shows a texturing pattern, similar to the pattern shown in FIG. 7A, and also two directions in which the finger moves along the texturing area: one direction is parallel to a reference axis, over which the texturing pattern extends, and another direction forms an acute angle relative to the reference axis.

According to one configuration, shown in FIG. 7F, the notches have a certain spatial extent over the reference axis R. When the finger moves parallel to the axis R over which the notches are spaced, the modulation function A is adjusted so that the time difference dt between two successive notches passing is as defined in connection with expression (5). A direction D in which the finger moves, forming an angle θ with the reference axis R, has been shown in FIG. 7F. The modulation function is adjusted on the basis of the component $V_R$, over the reference axis R, of the speed V of the finger. When the finger moves in the direction D, the time interval dt' between two successive notches is such that $$dt' = \frac{dr}{V_R} = \frac{dr}{V\cos\theta} \tag{6}$$

Figure 7G:
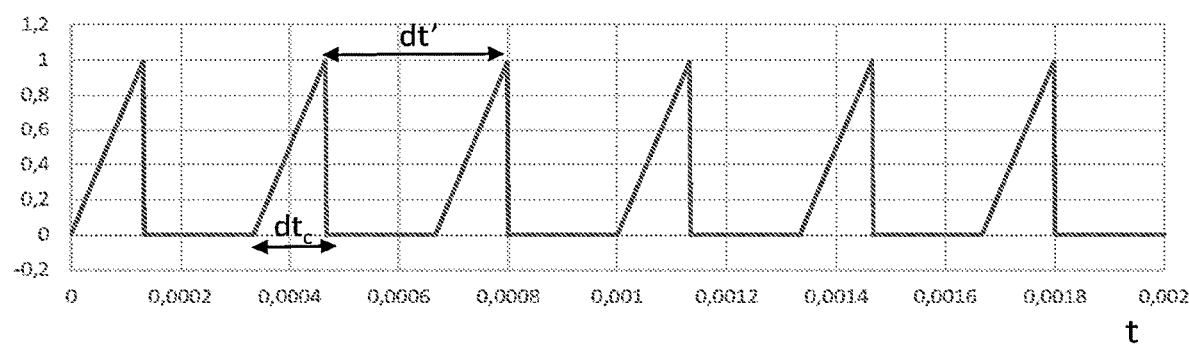
FIGS. 7G and 7H illustrate a modulation function corresponding to a movement of the finger in the direction forming an acute angle relative to the reference axis and in the direction parallel to the reference axis, respectively.
Figure 7H:
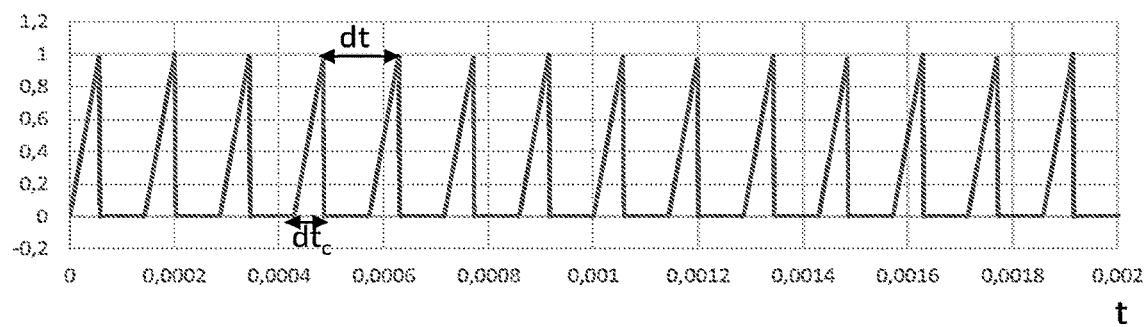
Figure 9C:
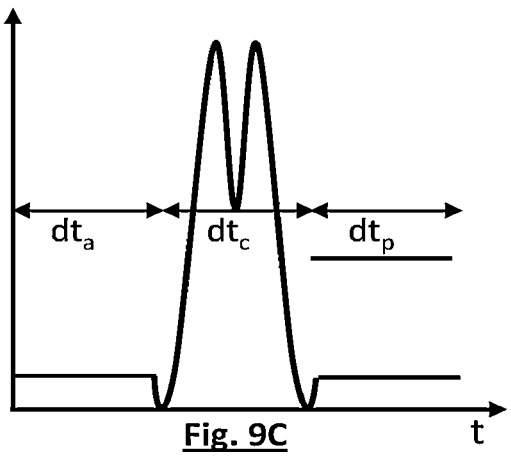
Figure 9D:
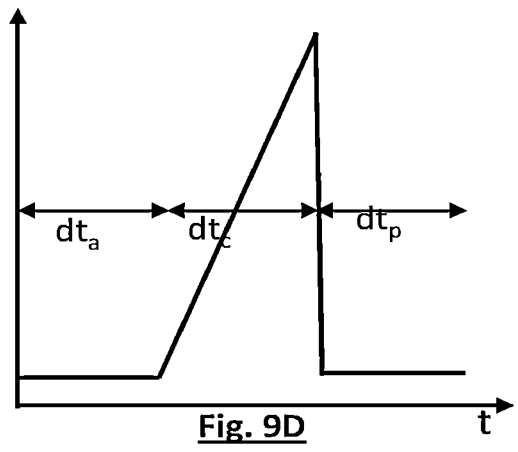
Figure 9E:
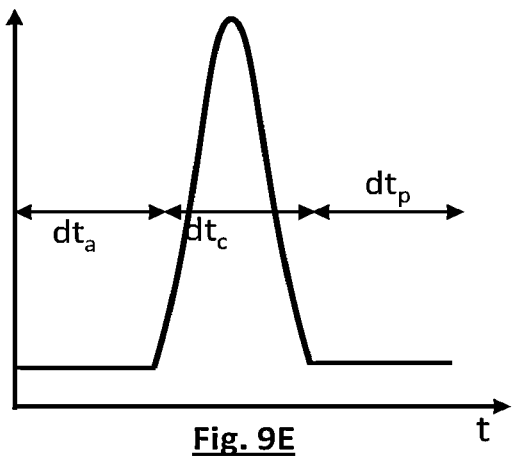
Figure 9F:
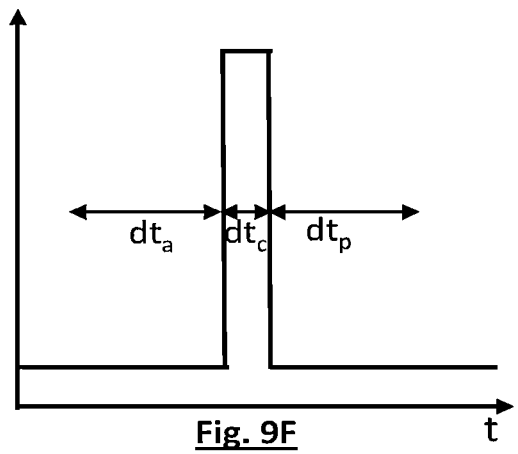
Figure 9G:
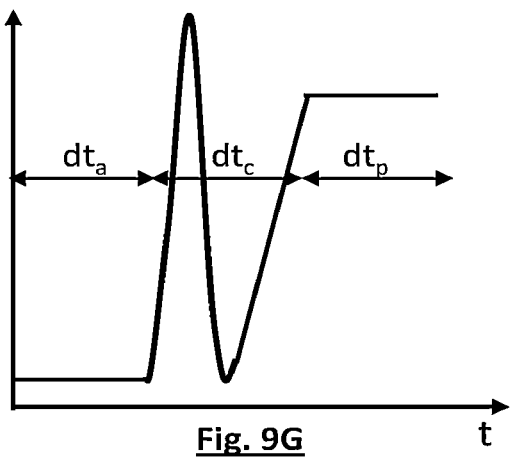
Figure 9H:
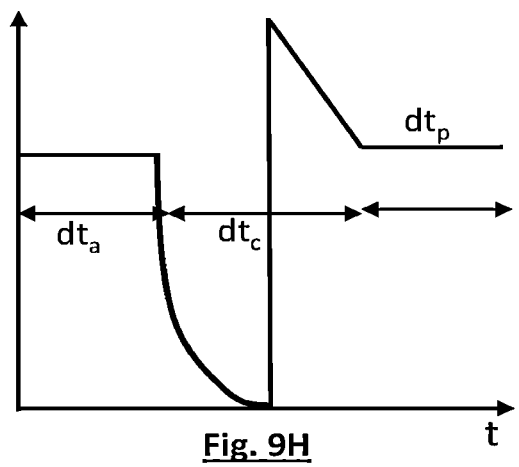

FIGS. 7G and 7H show a modulation function corresponding to a movement of the finger in the direction D and over the reference axis R, respectively. The Y-axis corresponds to the normalized amplitude. The X-axis corresponds to time t—unit s. We can see that the temporal shape depends on the speed over the reference axis. The length of the notch phase $dt_c$ changes between 140 μs (FIG. 7G) and 70 μs (FIG. 7H).

Generally, for a better feeling, the length of a notch phase $dt_c$ is preferably less than 100 ms, or even 1 ms, 500 μs or 250 μs. More generally, the length of a notch phase depends on the speed of the finger and the size of the virtual notch.

FIGS. 8A and 8B show a modulation function A and its time derivative, respectively. During the notch phase $dt_c$, the amplitude decreases, then increases, then decreases again. This results in the finger slowing down, then accelerating, before slowing down again. The combination of deceleration/acceleration/deceleration leads to a notch being perceived by the user. FIG. 8B shows the time derivative A' of the modulation function shown in FIG. 8A: the derivative is zero during the anterior and posterior phases. It fluctuates significantly during the notch phase, leading to the notch being perceived by the user.

Different sequences, or "patterns," can be defined that give rise to a notch effect. FIGS. 9A to 9H illustrate different possibilities. It will be recalled that a sequence corresponds to a succession containing an anterior phase, a notch phase and a posterior phase, leading to a haptic notch effect. The examples given in FIGS. 9A to 9H show that different sequences are possible. This allows a wide variety of notch sensations by the finger 9 to be obtained.

Figure 10:
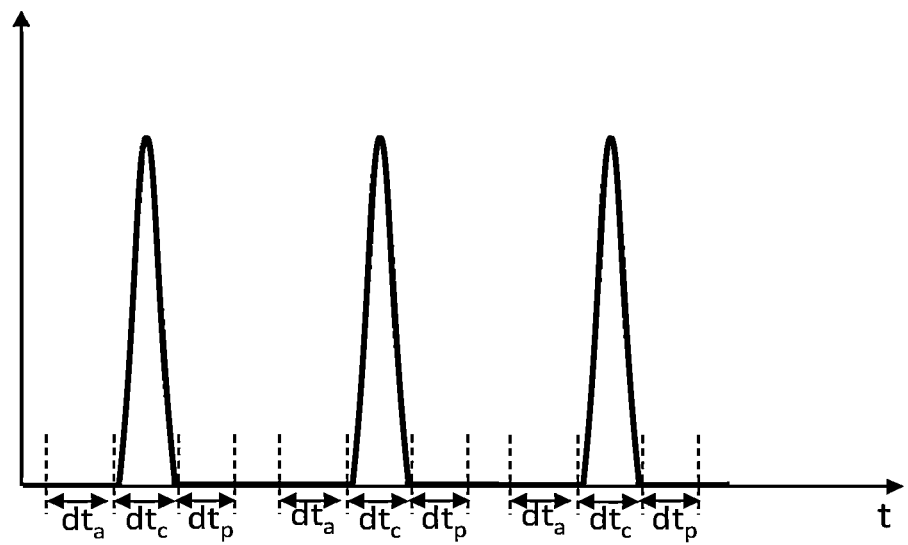
FIGS. 10 and 11 show modulation functions corresponding to successive notches that are distant from each other.
Figure 11:
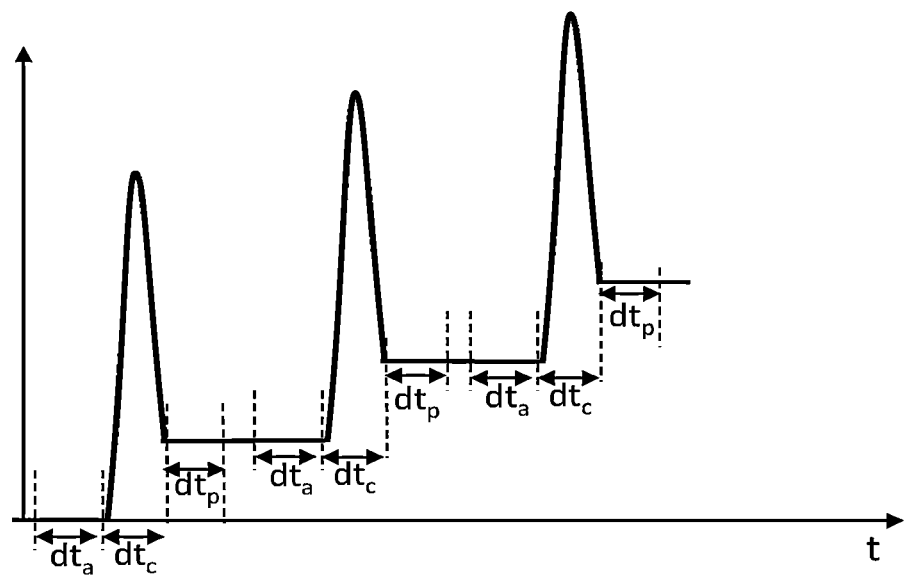

FIGS. 10 and 11 illustrate a modulation function A comprising a succession of anterior phase—notch phase—posterior phase sequences, each sequence corresponding to a notch.

Figure 12A:
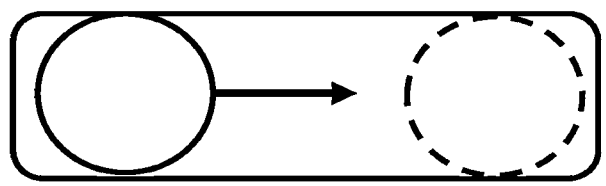
FIG. 12A shows an example of a texturing pattern mimicking a translation by a slider in a switch.
Figure 12B:
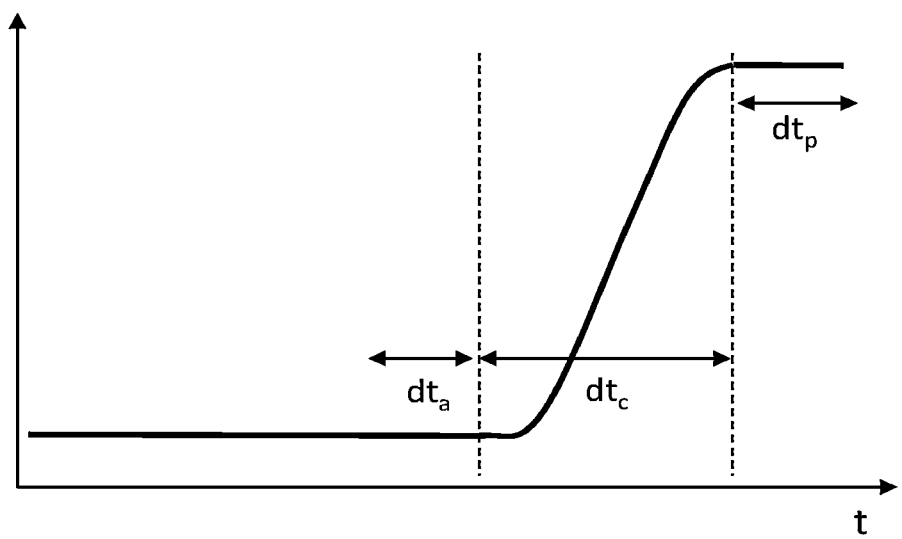
FIG. 12B is an example of a modulation function suitable for the pattern shown in FIG. 12A.

FIG. 12A shows a flat texturing area 10' having the appearance of a switch that can be used to switch between two positions. This is an on/off switch, for example. This type of switch is known in the field of touch interfaces. The finger acts on a virtual slider so as to translate it to one side or another of a travel area. The virtual slider is represented by a disk here. In the example shown, the finger acts from right to left to move the virtual slider. During the movement of the finger, a haptic sensation is produced, according to the activation function shown in FIG. 12B. FIG. 12B is positioned relative to FIG. 12A so that the modulation amplitude corresponds to the position of the finger on the switch. As the slider gets closer to its final position (to the right of the travel area), the amplitude of the modulation function increases, leading to an increase in the sliding sensation. When the final position is reached, the sliding sensation is at the maximum.

An advantage of embodiments of the disclosure is that the haptic presentation of a notch is configured by the modulation function. The presentation can also depend on the carrier: frequency and/or shape of the carrier, the carrier possibly being, in a nonlimiting manner, sinusoidal or rectangular or triangular.

According to one possibility, which is compatible with all the embodiments described, the activation signal is sent to the transducers only if the pressure exerted on the plate 10 by the finger exceeds a predetermined pressure threshold. In such an embodiment, the control unit 15 can compare a pressure measured by the pressure sensor 17 with a previously determined pressure threshold. On the basis of the comparison, the activation signal is, or is not, generated. For example, it can be generated only if the pressure exerted on the plate by the finger crosses a predetermined threshold.

Figure 13:
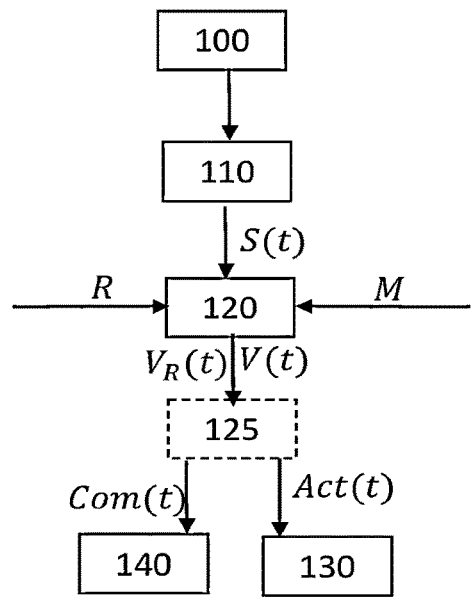
FIG. 13 shows the main steps of a method according to the disclosure.

FIG. 13 shows the main steps of a method for controlling a touch device, as described hereinabove.

Step 100: applying a finger to the plate.

Step 110: determining a position of the finger on the plate 10: the position sensor 14 forms a position signal S(t). During this step, the control unit 15 can check that the finger is positioned on a texturing area 10'. Otherwise, the following steps are not implemented.

Step 120: measuring a speed of movement of the finger on the interface, using the calculation unit 14', the latter generating a speed signal V(t) representing the speed of the finger. Step 120 can comprise determining a speed $V_R(t)$ relative to at least one reference axis R.

Step 130: on the basis of the speed that results from step 120, generating an activation signal Act(t). A virtual texturing pattern M is assigned to the texturing area 10'. The activation signal is formed by an amplitude modulation of a periodic carrier, so that the texturing pattern is felt by the user's finger. The temporal shape of the modulation function depends on the speed that results from step 120, on the reference axis R of the pattern M.

The device 1 can be an interface of an apparatus 20. The virtual texturing pattern M may then comprise notches spaced apart from one another. The texturing area 10' is configured to control a parameter of the apparatus on the basis of a position of the finger on the texturing area. According to this configuration, the method can comprise the following step:

Step 140: on the basis of the position of the finger, generating a control signal Com(t), which is transmitted to the device controlled by the interface. The control signal can be used to set the value of an operating parameter 18 associated with the texturing area 10' touched by the finger.

The method can comprise a step 125 of determining a pressure exerted on the plate by the finger and of comparing the pressure with a pressure threshold, on the basis of which steps 130 and 140 are, or are not, implemented.

Figure 14A:
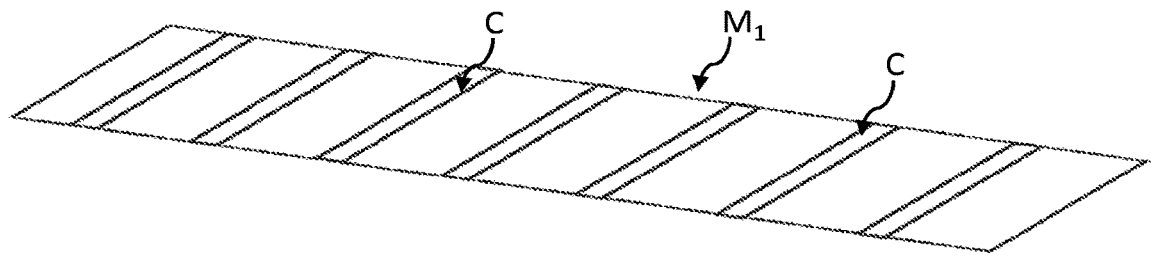
FIGS. 14A and 14B show two different patterns that can be successively assigned to the same texturing area.
Figure 14B:
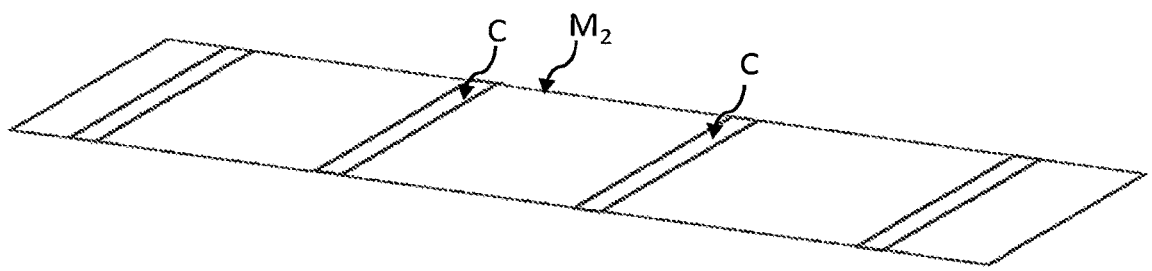

A notable advantage of embodiments of the disclosure is that the texturing pattern is a virtual pattern that is defined digitally, independently of the surface condition of the texturing area 10'. Embodiments of the disclosure can thus be used to define multiple virtual texturing patterns on respective different texturing areas, spaced apart from one another, on the same plate. Embodiments of the disclosure can also be used to assign multiple virtual texturing patterns to the same texturing area. For example, when the device is an interface, the same texturing area can be successively used for setting different parameters. The different parameters on the same texturing area can be set by respectively assigning different texturing patterns to the same texturing area. FIGS. 14A and 14B show two patterns $M_1$ and $M_2$ assigned to the same texturing area, in order to set two different parameters. These two virtual patterns define a different number and position of notches.

It is understood that embodiments of the disclosure can be used to define a wide variety of texturing patterns on the same texturing area, regardless of the actual condition of the surface of the plate in the texturing area 10'.

The interface is suitable for controlling consumer devices, for example in the field of domestic appliances or the dashboard of vehicles. The interface can be used to provide haptic feedback that is perceptible to the user. The haptic feedback mimics a mechanical response from a moving mechanical component: this makes using the interface simple and user-friendly.

The invention claimed is:

1. A method for implementing a touch device, the touch device comprising:
a plate comprising at least one texturing area, to which is assigned a texturing pattern that is virtual, the plate being touchable by an external body;
at least one transducer configured to vibrate the plate in line with an ultrasonic vibration producing an ultrasonic lubrication effect between the external body and the plate, the at least one transducer being configured to be controlled by an activation signal;
the method comprising:
moving the external body along a texturing area of the at least one texturing area;
determining a position of the external body on the texturing area of the at least one texturing area;
measuring a speed of the external body along the plate;
when the external body moves along the texturing area of the at least one texturing area, generating the activation signal, the activation signal depending on the texturing pattern, so as to activate the at least one transducer, or each of the at least one transducer, such that the activation signal results in the plate being vibrated in line with the ultrasonic vibration, the ultrasonic vibration giving rise to a change in friction between the plate and the external body, the moving external body feeling the texturing pattern as a result of its movement along the texturing area of the at least one texturing area;
wherein:
the texturing pattern is oriented relative to a reference axis;
measuring the speed of the external body along the plate comprises:
determining an angle between a trajectory of the external body and the reference axis; and
calculating a projection of a speed of the external body on the reference axis based on the angle;
generating the activation signal comprises the activation signal depending on the texturing pattern and the projection of the speed of the external body on the reference axis;
such that, when the external body moves along the texturing area of the at least one texturing area, the friction between the plate and the external body is changed:
with the position of the external body on the texturing area of the at least one texturing area; and with the projection of the speed of the external body on the reference axis.

2. The method of claim 1, wherein generating the activation signal comprises creating the activation signal from:
a periodic carrier wave, the periodic carrier wave extending, in each period, over an amplitude; and
a modulation function that changes, during the movement of the external body, according to a temporal shape depending on the texturing pattern and the projection of the speed of the external body on the reference axis;
so that the amplitude of the activation signal results from a modulation of the periodic carrier wave by the modulation function.

3. The method of claim 2, wherein generating the activation signal further comprises generating the activation signal at different instants so that:
at each of the instants, the amplitude of the modulation function depends on the position of the external body; and
between two successive instants of the instants, the temporal shape of the modulation function is adjusted based on a change in the projection of the speed of the external body on the reference axis.

4. The method of claim 3, wherein:
the texturing pattern is a periodic pattern that extends over a spatial period parallel to the reference axis; and
the temporal shape of the modulation function is periodic over a time period, a length of the time period depending on the projection of the speed of the external body on the reference axis and the spatial period of the texturing pattern.

5. The method of claim 2, wherein:
the temporal shape of the modulation function depends on the angle between the trajectory and the reference axis.

6. The method of claim 2, wherein:
the texturing pattern comprises at least one notch, the at least one notch corresponding to a relief or to a hollow in the texturing pattern; and
the modulation function of the activation signal is determined such that a notch effect is experienced by a user when the external body passes over a notch of the at least one notch.

7. The method of claim 6, wherein:
when the external body passes on either side of the notch of the at least one notch, the modulation function successively comprises:
an anterior phase when the external body approaches the notch of the at least one notch;
a notch phase when the external body crosses the notch of the at least one notch; and
a posterior phase when the external body moves away from the notch of the at least one notch;
a feeling of the notch, of the at least one notch, by the user depends on the modulation function during the anterior phase, the notch phase, and the posterior phase; and
the modulation function is such that in the notch phase the modulation function changes over a wider range of variation than in the anterior phase and in the posterior phase.

8. The method of claim 7, wherein in the notch phase the modulation function is such that an absolute value of its time derivative reaches a higher maximum value than in the anterior phase and in the posterior phase.

9. The method of claim 7, wherein:
the notch, of the at least one notch, is oriented relative to the reference axis; and
a length of the anterior phase, the notch phase, and the posterior phase depends on the projection of the speed of the external body on the reference axis.

10. The method of claim 6, wherein:
the texturing pattern comprises several notches, of the at least one notch; and the modulation function is such that each notch of the several notches has an associated anterior phase, notch phase, and posterior phase.

11. The method of claim 10, wherein:
the notches, of the several notches, are distant from each other along the reference axis; and
a time interval between two notch phases respectively associated with two successive notches, of the several notches, depends on a distance between the two successive notches and the projection speed of the external body on the reference axis.

12. The method of claim 11, wherein the reference axis is linear or curved or piecewise linear.

13. The method of claim 6, wherein:
the touch device is a touch interface that is configured to control an apparatus connected to the touch interface;
the touch interface is configured to adjust a value of at least one operating parameter of the apparatus based on the position of the external body on the texturing area of the at least one texturing area, the texturing area of the at least one texturing area allowing the value of the at least one operating parameter to be adjusted; and
the method further comprises generating a control signal for the apparatus based on the position of the external body on the texturing area of the at least one texturing area.

14. The method of claim 1, wherein:
the texturing pattern is oriented relative to a first reference axis and a second reference axis;
measuring the speed of the external body along the plate comprises measuring a first projection of the speed on the first reference axis and a second projection of the speed on the second reference axis; and
generating the activation signal comprises, during the movement of the external body:
generating a first activation signal that is formed by a first periodic wave carrier modulated by a first modulation function, a temporal shape of the first modulation function depending on the first projection of the speed;
generating a second activation signal that is formed by a second periodic carrier modulated by a second modulation function, a temporal shape of the second modulation function depending on the second projection of the speed; and
combining the first activation signal and the second activation signal to form the activation signal.

15. The method of claim 14, wherein:
the texturing pattern is a periodic pattern that extends over a first spatial period parallel to the first reference axis;
the first modulation function is periodic over a first time period, a length of the first time period depending on the first projection of the speed and the first spatial period of the periodic pattern;
the texturing pattern extends over a second spatial period parallel to the second reference axis; and
the second modulation function is periodic over a second time period, a length of the second time period depending on the second projection of the speed and the second spatial period of the periodic pattern.

16. The method of claim 1, wherein the touch device further comprises a pressure sensor configured to measure a pressure exerted on the plate by the external body, the method further comprising:
- measuring the pressure exerted on the plate;
- comparing the measured pressure with a predetermined threshold; and
- when the pressure exerted is greater than the predetermined threshold, implementing the measurement of the speed of the external body along the plate and the generation of the activation signal.

17. The method of claim 1, wherein determining the position of the external body on the texturing area of the at least one texturing area comprises using a capacitive sensor.

18. The method of claim 1, wherein the external body is a finger.

19. A touch device comprising a plate that is touchable by an external body, the plate comprising at least one texturing area to which a virtual texturing pattern is assigned, the touch device further comprising:
- at least one transducer configured to vibrate the plate;
- a position sensor configured to generate a position signal, the position signal representing a position of the external body on the plate;
- a calculation unit for determining a speed signal based on position signals that are respectively generated at different instants, the speed signal representing a speed of the external body along the plate; and
- a control unit that is connected to the position sensor and to the calculation unit and configured to implement, as recited in claim 1, the generation of the activation signal based on the position signal generated from the position sensor and the speed signal determined from the calculation unit.

20. The touch device of claim 19, wherein the position sensor is a capacitive sensor and comprises a network of conductive tracks configured to detect the external body by capacitive coupling through all or part of the plate.

21. The touch device of claim 19, further comprising a screen, wherein:
- the plate is transparent; and
- the plate is arranged against the screen.

22. The touch device of claim 19, wherein:
- the touch device is a touch interface that is configured to control an apparatus connected to the touch interface;
- the touch device comprises the at least one texturing area, the at least one texturing area being configured for adjusting a value of an operating parameter of the apparatus, the at least one texturing area comprising at least two notches that are spaced apart from one another; and
- the control unit is configured to adjust the value of the operating parameter based on a position of the external body on a texturing area of the at least one texturing area.

23. An apparatus configured to be controlled by a parameter and comprising a touch interface that is configured to select the parameter or to set a value of the parameter, the touch interface being the touch device of claim 22.

* * * * *